United States Patent
Zhang et al.

(10) Patent No.: US 10,879,972 B2
(45) Date of Patent: Dec. 29, 2020

(54) LINEAR PRECODING IN FULL-DIMENSIONAL MIMO SYSTEMS AND DYNAMIC VERTICAL SECTORIZATION

(71) Applicant: QUALCOMM Incorporated, San Diego, CA (US)

(72) Inventors: Yu Zhang, Beijing (CN); Chao Wei, Beijing (CN); Peng Cheng, Beijing (CN); Neng Wang, Lund (SE); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/573,304

(22) Filed: Sep. 17, 2019

(65) Prior Publication Data

US 2020/0014437 A1    Jan. 9, 2020

Related U.S. Application Data

(63) Continuation of application No. 14/786,854, filed as application No. PCT/CN2014/078633 on May 28, (Continued)

(51) Int. Cl.
*H04B 7/04* (2017.01)
*H04B 7/0456* (2017.01)
(Continued)

(52) U.S. Cl.
CPC .......... *H04B 7/0478* (2013.01); *H04B 7/043* (2013.01); *H04B 7/0452* (2013.01);
(Continued)

(58) Field of Classification Search
CPC .................................................. H04B 7/0478
See application file for complete search history.

(56) References Cited

U.S. PATENT DOCUMENTS

| | | | |
|---|---|---|---|
| 9,148,205 B2 | 9/2015 | Bhattad et al. | |
| 10,461,824 B2 | 10/2019 | Zhang et al. | |

(Continued)

FOREIGN PATENT DOCUMENTS

| | | |
|---|---|---|
| CN | 1866924 A | 11/2006 |
| CN | 101431357 A | 5/2009 |

(Continued)

OTHER PUBLICATIONS

International Preliminary Report on Patentability—PCT/CN2013/076567, The International Bureau of WIPO—Geneva, Switzerland, dated Dec. 10, 2015.

(Continued)

*Primary Examiner* — John D Blanton
(74) *Attorney, Agent, or Firm* — Patterson + Sheridan, LLP

(57) ABSTRACT

Certain aspects of the present disclosure provide methods and apparatus for linear precoding in full-dimensional MIMO (FD-MIMO) systems. According to aspects, an eNB may compress a larger number of antenna elements to a smaller number of antenna ports. The eNB may use a port precoding matrix to transmit reference signals to a UE, receive feedback regarding CSI based on the reference signals, and transmit data to the UE, based on a mapping of multiple data layers and mapping of antenna ports to the physical antenna elements. Further, aspects include performing elevation beamforming by dynamically forming one or more vertical sectors based on UE feedback in the elevation domain.

30 Claims, 26 Drawing Sheets

Related U.S. Application Data 2014, now Pat. No. 10,461,824, which is a continuation of application No. PCT/CN2013/077277, filed on Jun. 14, 2013, and a continuation of application No. PCT/CN2013/076567, filed on May 31, 2013.

(51) Int. Cl.

| | | |
|---|---|---|
| *H04L 1/00* | (2006.01) | |
| *H04W 16/10* | (2009.01) | |
| *H04L 1/06* | (2006.01) | |
| *H04L 1/18* | (2006.01) | |
| *H04B 7/06* | (2006.01) | |
| *H04B 7/0452* | (2017.01) | |
| *H04W 16/28* | (2009.01) | |
| *H04B 7/0426* | (2017.01) | |

(52) U.S. Cl.
CPC ......... *H04B 7/0617* (2013.01); *H04L 1/0026* (2013.01); *H04L 1/06* (2013.01); *H04L 1/1867* (2013.01); *H04W 16/10* (2013.01); *H04W 16/28* (2013.01); *H04B 7/0456* (2013.01); *H04B 7/063* (2013.01); *H04B 7/0626* (2013.01); *H04B 7/0632* (2013.01); *H04B 7/0639* (2013.01)

(56) References Cited

U.S. PATENT DOCUMENTS

| | | | |
|---|---|---|---|
| 2010/0202560 A1 | 8/2010 | Luo et al. | |
| 2010/0246712 A1 | 9/2010 | Suo et al. | |
| 2011/0200081 A1 | 8/2011 | Guo et al. | |
| 2011/0216846 A1 | 9/2011 | Lee, II et al. | |
| 2012/0207145 A1 | 8/2012 | Han et al. | |
| 2012/0270535 A1 | 10/2012 | Chen et al. | |
| 2012/0315938 A1 | 12/2012 | Van Nee et al. | |
| 2013/0058424 A1 | 3/2013 | Enescu et al. | |
| 2013/0120191 A1 | 5/2013 | Zhang et al. | |
| 2013/0329664 A1* | 12/2013 | Kim ................ | H04B 7/0413 370/329 |
| 2014/0016714 A1 | 1/2014 | Chen et al. | |
| 2014/0038619 A1 | 2/2014 | Moulsley et al. | |
| 2014/0056167 A1* | 2/2014 | Yuan ................ | H04L 5/0057 370/252 |
| 2014/0177531 A1* | 6/2014 | Imamura ........... | H04L 5/0035 370/328 |
| 2014/0355709 A1* | 12/2014 | Liu ................ | H04W 72/042 375/267 |
| 2015/0078472 A1* | 3/2015 | Vook ................ | H04B 7/0456 375/267 |
| 2016/0080059 A1 | 3/2016 | Yoon et al. | |

FOREIGN PATENT DOCUMENTS

| | | |
|---|---|---|
| CN | 101646175 A | 2/2010 |
| CN | 102122983 A | 7/2011 |
| CN | 102468925 A | 5/2012 |
| CN | 102714530 A | 10/2012 |
| CN | 102714647 A | 10/2012 |
| EP | 2159978 A1 | 3/2010 |
| EP | 2475126 A1 | 7/2012 |
| EP | 2575278 A1 | 4/2013 |
| EP | 2400672 B1 | 6/2014 |
| EP | 2869478 A1 | 5/2015 |
| EP | 2930873 A1 | 10/2015 |
| EP | 3116280 A1 | 1/2017 |
| EP | 2556598 B1 | 12/2017 |
| EP | 2494730 B1 | 4/2018 |
| EP | 3014785 B1 | 10/2018 |
| EP | 2978155 B1 | 11/2018 |
| EP | 2984765 B1 | 12/2018 |
| EP | 2993804 B1 | 6/2019 |
| EP | 2996258 B1 | 7/2019 |
| EP | 2374221 B1 | 9/2019 |
| JP | 2004080353 A | 3/2004 |
| JP | 2010518778 A | 5/2010 |
| JP | 2010233215 A | 10/2010 |
| JP | 2011004212 A | 1/2011 |
| WO | 2011091440 A1 | 7/2011 |
| WO | 2011146606 A1 | 11/2011 |
| WO | 2012112281 A2 | 8/2012 |
| WO | 2012141428 A1 | 10/2012 |
| WO | 2012146280 A1 | 11/2012 |
| WO | 2013024350 A2 | 2/2013 |
| WO | 2013024852 A1 | 2/2013 |
| WO | 2013025558 A1 | 2/2013 |
| WO | 2013048505 A1 | 4/2013 |
| WO | 2014099341 A1 | 6/2014 |
| WO | 2015109463 A1 | 7/2015 |

OTHER PUBLICATIONS

International Preliminary Report on Patentability—PCT/CN2013/077277, The International Bureau of WIPO—Geneva, Switzerland, dated Dec. 23, 2015.
International Preliminary Report on Patentability—PCT/CN2014/078633, The International Bureau of WIPO—Geneva, Switzerland, dated Dec. 10, 2015.
International Search Report and Written Opinion—PCT/CN2013/076567—ISA/EPO—dated Feb. 27, 2014.
International Search Report and Written Opinion—PCT/CN2013/077277—ISA/EPO—dated Mar. 20, 2014.
International Search Report and Written Opinion—PCT/CN2014/078633—ISA/EPO—dated Aug. 22, 2014.
Supplementary European Search Report—EP14803412—Search Authority—Munich—dated Dec. 15, 2016.
Huawei: "Adaptation of the Number of DRS/SRS Antenna Ports for UL", 3GPP TSG RAN WG1 #56bis, 3GPP Draft; R1-091276-Adaptation of the Number of DRS_SRS Antenna Ports for UL, 3rd Generation Partnership Project (3GPP), Mobile Competence Centre; 650, Route Des Lucioles; F-06921 Sophia-Antipolis Cedex; France, No. Seoul, Korea; Mar. 17, 2009, Mar. 17, 2009 (Mar. 17, 2009), 5 Pages, Mar. 23, 2009-Mar. 27, 2009, XP050338884, [retrieved on Mar. 17, 2009] Sections 2 and 4.
Huawei: "Considerations on downlink antenna mapping," R1-091795, Agenda Item 15.1, 3GPP TSG RAN WG1 #57, San Francisco, USA, May 4-8, 2009, 7 pages.
Huawei: "Discussion on the definition of eight antenna ports in DL LTE-A," R1-091262, Agenda Item 15.1, 3GPP TSG RAN WG1#56bis, Seoul, Republic of Korea, Mar. 23-27, 2009, 5 pages.
Huawei et al., "Antenna port association for EPDCCH," R1-124699, Agenda Item: 6.23.4, 3GPP TSG RAN WG1 Meeting #71, New Orleans, USA, Nov. 12-16, 2012, 6 pages.
Huawei, et al., "Beamforming enhancement in LTE-Advanced," R1-084521, Agenda Item: 11.3, 3GPP TSG RAN WG1 meeting #55, Prague, Czech Republic, Nov. 10-14, 2008, 5 pages.
Huawei: "Extensions to Rel-8 type CQI/PMI/RI Feedback Using Double Codebook structure," R1-100251, Agenda Item: 7.2.4.1, 3GPP TSG RAN WG1# 59bis, Valencia, Spain, Jan. 18-22, 2010, 4 pages.
Huawei: "Performances of transmit diversity for PUSCH," R1-090824, Agenda Item: 123, 3GPP TSG RAN WG1# 56, Athens, Greece, Feb. 9-13, 2009, 9 pages.
Huawei: "The number Of DRS/SRS antenna ports for UL", R1-091813, Agenda Item 15.5, 3GPP TSG RAN WG1 #57 San Francisco, USA, May 4-8, 2009, XP050339327, 5 pages.
Intel Corporation: "Potential performance improvement in FD-MIMO systems," R1-140126, Agenda item 1.2.7.6, 3GPP TSG-RAN WG1#76, Prague, Czech Republic, Feb. 10-14 2014, 3 pages.

\* cited by examiner

- Type-1 Sub-array
  - $S_1 = I_{64}$
  - $R = 8$

- Type-8a Sub-array
  - $(S_1\ S_2\ \ldots\ S_8) = I_{64}$,
  - $R = 2$

- Type-8c Sub-array
  - $(S_1\ S_2\ \ldots\ S_8) = I_2 \otimes (A_1\ A_2\ A_3\ A_4) \otimes I_2,$
    $A_i = I_4 \otimes e_i, i = 1,2,\ldots,4, (e_1\ e_2\ e_3\ e_4) = I_4$
  - R = 1

LINEAR PRECODING IN FULL-DIMENSIONAL MIMO SYSTEMS AND DYNAMIC VERTICAL SECTORIZATION

CROSS-REFERENCE TO RELATED APPLICATIONS

This application is a continuation of U.S. patent application Ser. No. 14/786,854, filed Oct. 23, 2015, which claims benefit of priority to International Application No. PCT/CN2014/078633, filed May 28, 2014, which claims benefit of priority to International Application No. PCT/CN2013/076567, filed May 31, 2013 and International Application No. PCT/CN2013/077277, filed Jun. 14, 2013, each of which is assigned to the assignee of the present application and expressly incorporated herein by reference in its entirety.

BACKGROUND

Field of the Disclosure

The present disclosure relates generally to wireless communication. More particularly, certain aspects relate to processing in FD-MIMO systems. Additionally, aspects pertain to dynamic vertical sectorization by an eNB.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure provide a method for wireless communication by an evolved Node B (eNB). The method generally includes generating a port precoding matrix which compresses a larger number of antenna elements to a smaller number of antenna ports, transmitting UE-specific port reference signals to a user equipment (UE) using the port precoding matrix, receiving feedback regarding channel state information (CSI) measured by the UE based on the UE-specific port reference signals, mapping multiple data layers to UE-specific antenna ports based on the feedback regarding CSI, mapping each of the UE-specific antenna ports to physical antenna elements, and transmitting data to the UE, based on the mapping of the multiple data layers and the mapping of antenna ports to the physical antenna elements.

Aspects of the present disclosure provide an apparatus for wireless communication. The apparatus generally includes means for generating a port precoding matrix which compresses a larger number of antenna elements to a smaller number of antenna ports, means for transmitting UE-specific port reference signals to a UE using the port precoding matrix, means for receiving feedback regarding CSI measured by the UE based on the UE-specific port reference signals, means for mapping multiple data layers to UE-specific antenna ports based on the feedback regarding CSI, means for mapping each of the UE-specific antenna ports to physical antenna elements, and means for transmitting data to the UE, based on the mapping of the multiple data layers and the mapping of antenna ports to physical antenna elements.

Aspects of the present disclosure provide an apparatus for wireless communication. The apparatus generally includes at least one processor and a memory coupled to the at least one processor. The at least one processor is generally configured to generate a port precoding matrix which compresses a larger number of antenna elements to a smaller number of antenna ports, transmit UE-specific port reference signals to a UE using the port precoding matrix, receive feedback regarding CSI measured by the UE based on the UE-specific port reference signals, map multiple data layers to UE-specific antenna ports based on the feedback regarding CSI, map each of the UE-specific antenna ports to physical antenna elements, and transmit data to the UE, based on the mapping of the multiple data layers and the mapping of antenna ports to the physical antenna elements.

Certain aspects of the present disclosure provide a computer-program product for wireless communication. The computer-program product may include a non-transitory computer-readable medium having code stored thereon. The code generally includes instructions for generating a port precoding matrix which compresses a larger number of antenna elements to a smaller number of antenna ports, transmitting UE-specific port reference signals to a UE using the port precoding matrix, receiving feedback regarding CSI measured by the UE based on the UE-specific port reference signals, mapping multiple data layers to UE-specific antenna ports based on the feedback regarding CSI, mapping each of the UE-specific antenna ports to physical antenna elements, and transmitting data to the UE, based on the mapping of the multiple data layers and the mapping of antenna ports to physical antenna elements.

Aspects of the present disclosure provide a method for wireless communication by a user equipment (UE). The method generally includes receiving UE-specific port reference signals transmitted by an evolved Node B (eNB) using a long-term port precoding matrix which compresses a larger number of antenna elements to a smaller number of antenna ports, measuring and quantizing short-term channel state information (CSI) based on the UE-specific port reference signals, and transmitting feedback regarding the quantized, short-term CSI to the eNB.

Aspects of the present disclosure provide an apparatus for wireless communication. The apparatus generally includes means for receiving UE-specific port reference signals transmitted by an eNB using a long-term port precoding matrix which compresses a larger number of antenna elements to a smaller number of antenna ports, means for measuring and quantizing short-term channel state information (CSI) based on the UE-specific port reference signals, and means for transmitting feedback regarding the quantized, short-term CSI to the eNB.

Aspects of the present disclosure provide an apparatus for wireless communication. The apparatus generally includes at least one processor and a memory coupled to the at least one processor. The at least one processor is generally configured to receive UE-specific port reference signals transmitted by an eNB using a long-term port precoding matrix which compresses a larger number of antenna elements to a smaller number of antenna ports, measure and quantize short-term channel state information (CSI) based on the UE-specific port reference signals, and transmit feedback regarding the quantized, short-term CSI to the eNB.

Certain aspects of the present disclosure provide a computer-program product for wireless communication. The computer-program product may include a non-transitory computer-readable medium having code stored thereon. The code generally includes instructions for receiving UE-specific port reference signals transmitted by an evolved Node B (eNB) using a long-term port precoding matrix which compresses a larger number of antenna elements to a smaller number of antenna ports, measuring and quantizing short-term channel state information (CSI) based on the UE-specific port reference signals, and transmitting feedback regarding the quantized, short-term CSI to the eNB.

Certain aspects of the present disclosure provide a method for wireless communication. The method generally includes receiving, at an evolved Node B (eNB), feedback from a plurality of user equipments (UEs), determining, by the eNB, a correlation among the plurality of UEs, configuring, by the eNB, one or more UE clusters based on the correlation, wherein each of the one or more UE clusters includes two or more UEs of the plurality having correlation within a predetermined threshold, dynamically configuring, by the eNB, a vertical sector for each UE cluster of the one or more UE clusters, and forming, by the eNB, an elevation beam corresponding to the vertical sector for each UE cluster of the one or more UE clusters.

Certain aspects of the present disclosure provide an apparatus for wireless communication. The apparatus generally includes means receiving, at an evolved Node B (eNB), feedback from a plurality of user equipments (UEs), means for determining, by the eNB, a correlation among the plurality of UEs, means for configuring, by the eNB, one or more UE clusters based on the correlation, wherein each of the one or more UE clusters includes two or more UEs of the plurality having correlation within a predetermined threshold, means for dynamically configuring, by the eNB, a vertical sector for each UE cluster of the one or more UE clusters, and means for forming, by the eNB, an elevation beam corresponding to the vertical sector for each UE cluster of the one or more UE clusters.

Certain aspects of the present disclosure provide an apparatus for wireless communication. The apparatus generally at least one processor and a memory coupled to the at least one processor. The at least one processor is generally configured to receive, at an eNB, feedback from a plurality UEs, determine, by the eNB, a correlation among the plurality of UEs, configure, by the eNB, one or more UE clusters based on the correlation, wherein each of the one or more UE clusters includes two or more UEs of the plurality having correlation within a predetermined threshold, dynamically configure, by the eNB, a vertical sector for each UE cluster of the one or more UE clusters, and form, by the eNB, an elevation beam corresponding to the vertical sector for each UE cluster of the one or more UE clusters.

Certain aspects of the present disclosure provide a computer-program product for wireless communication. The computer-program product may include a non-transitory computer-readable medium having code stored thereon. The code generally includes instructions for receiving, at an eNB, feedback from a plurality UEs, determining, by the eNB, a correlation among the plurality of UEs, configuring, by the eNB, one or more UE clusters based on the correlation, wherein each of the one or more UE clusters includes two or more UEs of the plurality having correlation within a predetermined threshold, dynamically configuring, by the eNB, a vertical sector for each UE cluster of the one or more UE clusters, and forming, by the eNB, an elevation beam corresponding to the vertical sector for each UE cluster of the one or more UE clusters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
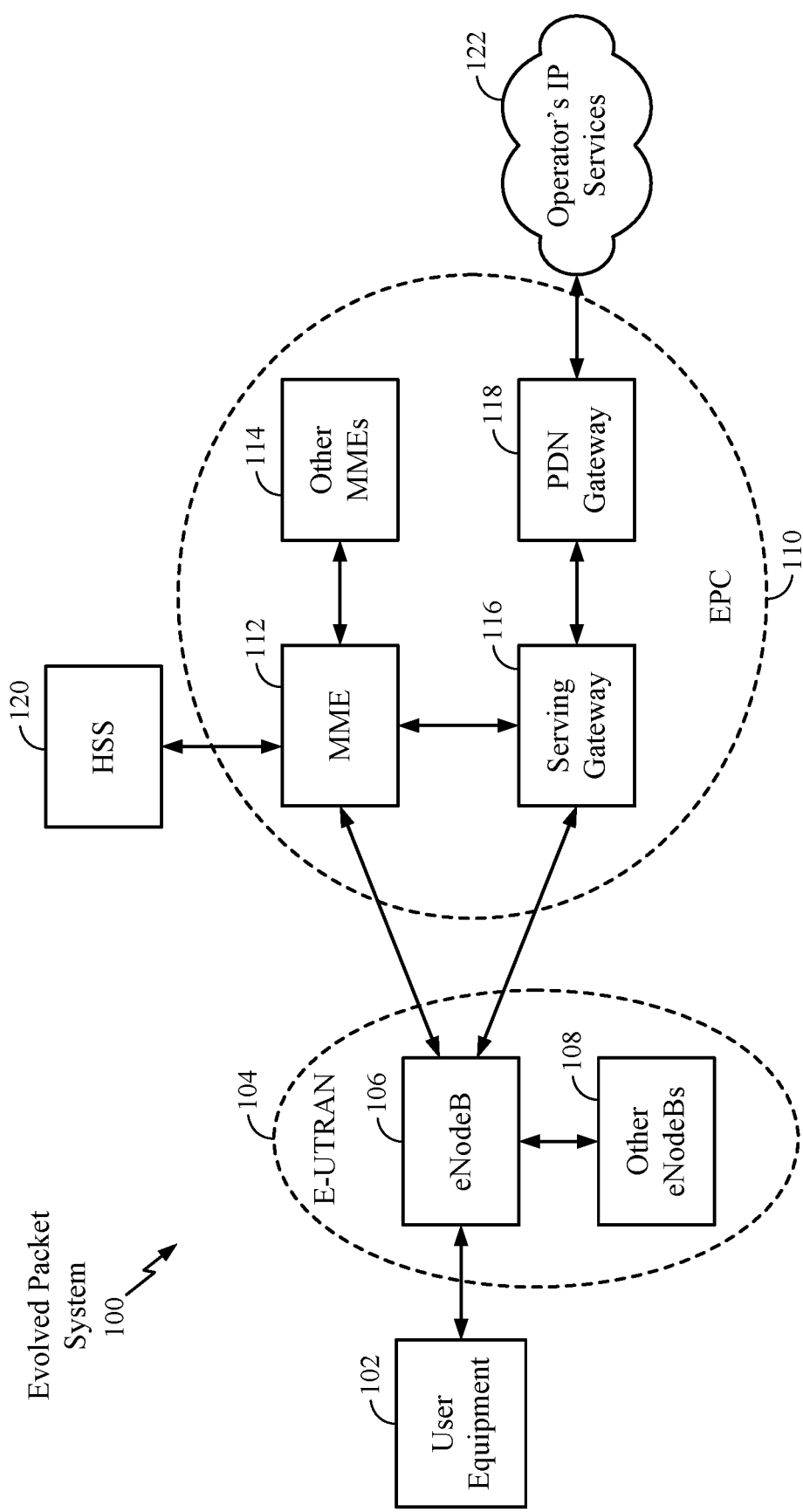
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
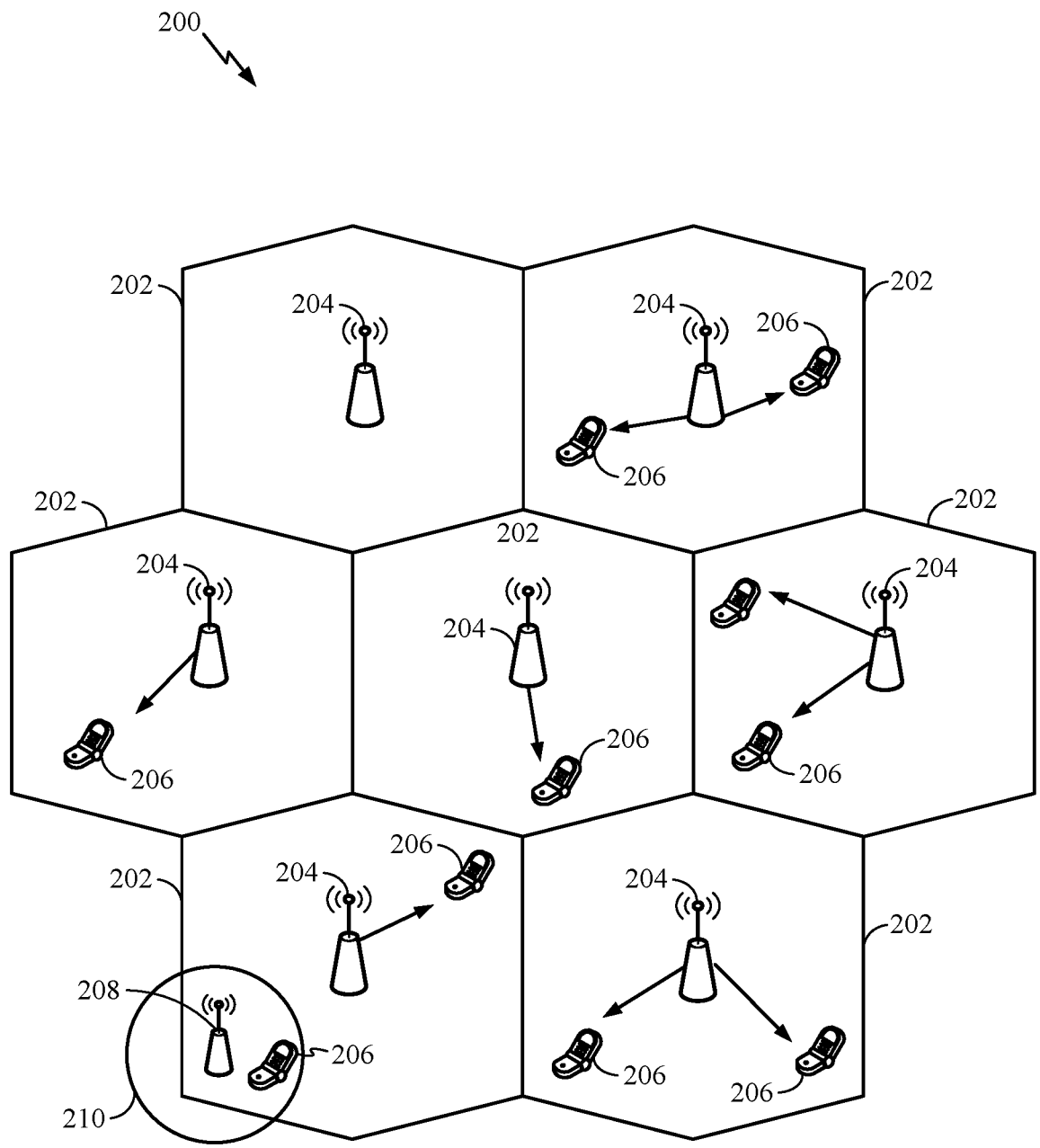
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
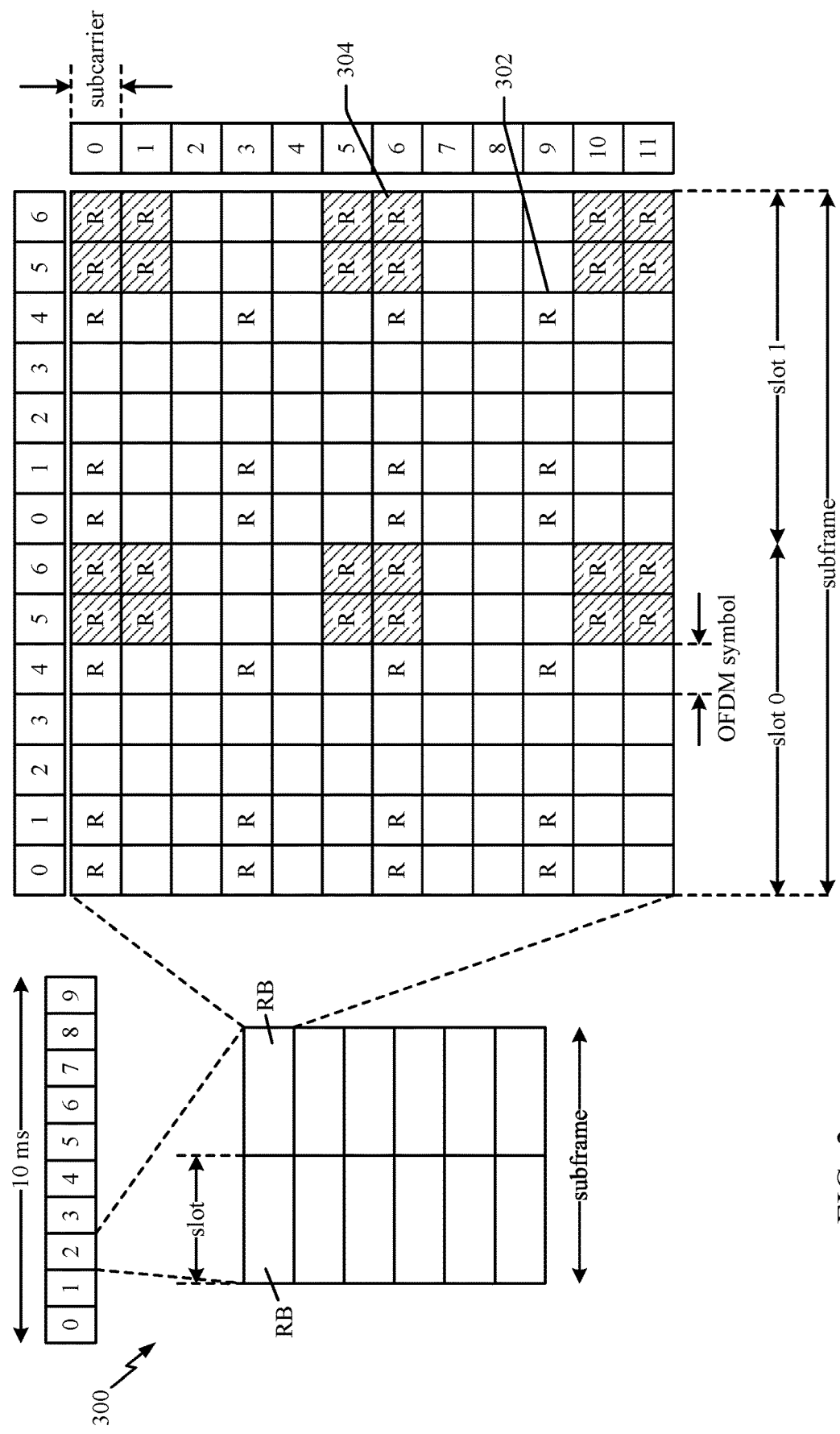
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
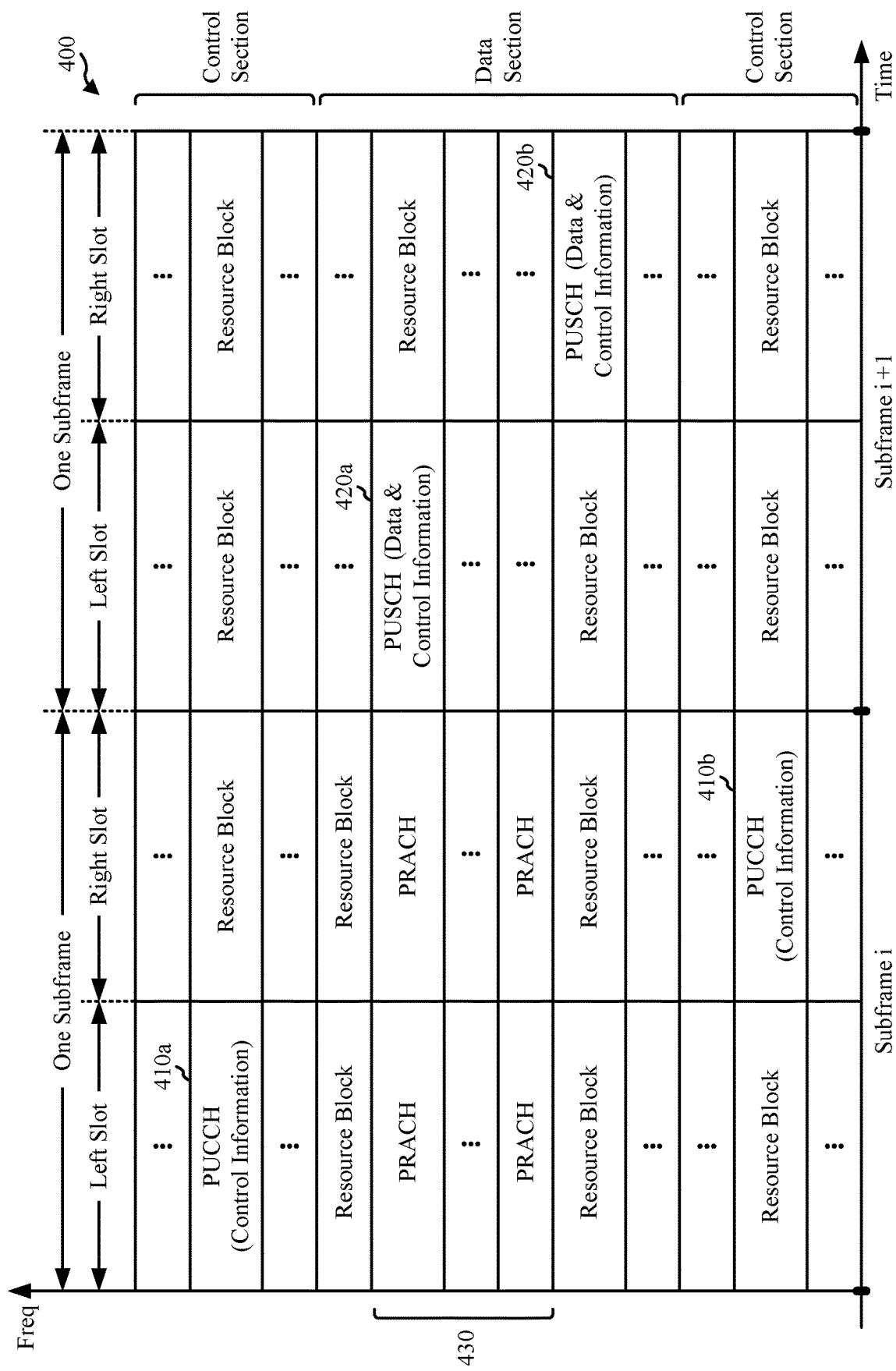
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
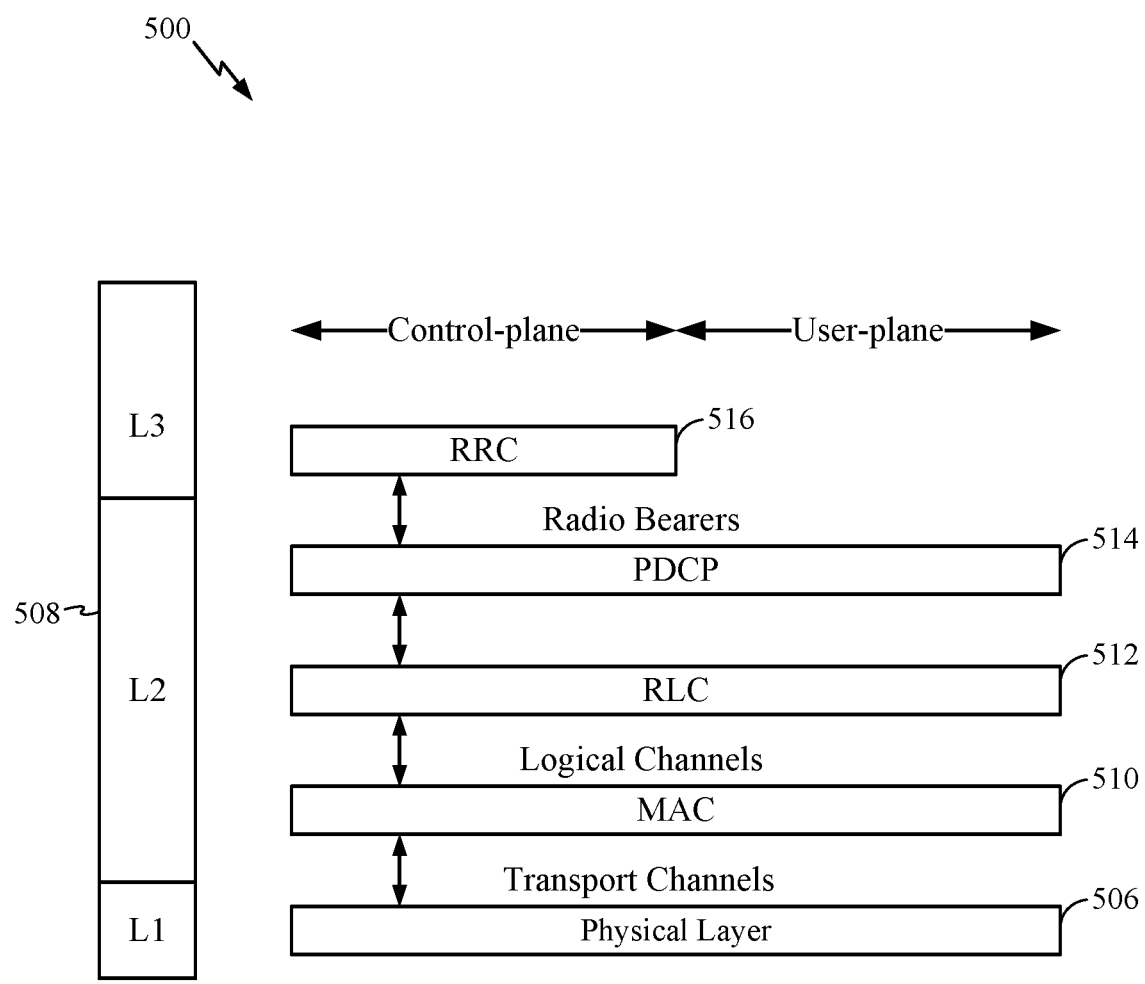
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
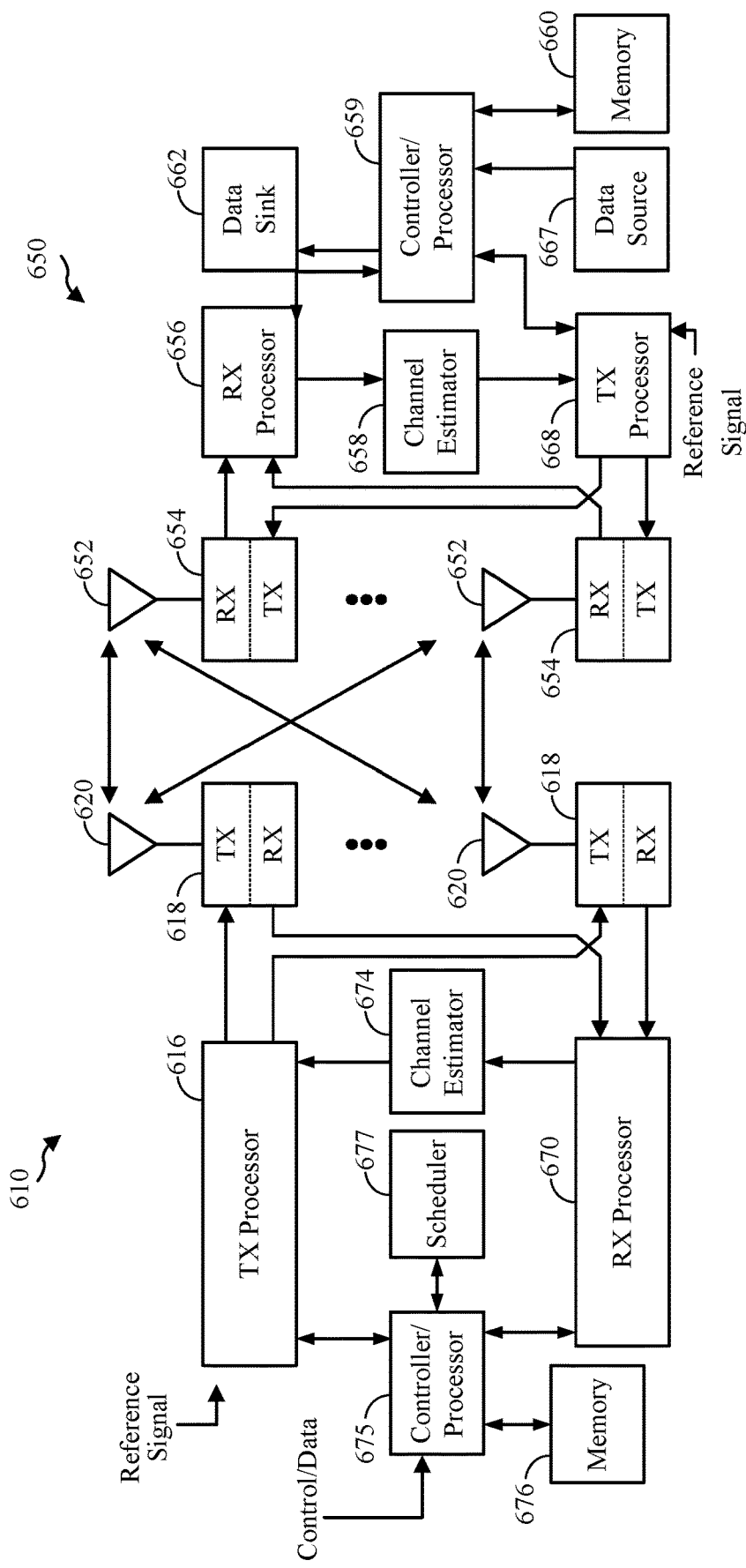
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The controllers/processors 675 and 659 may direct the operation at the eNB 610 and the UE 650, respectively. The controller/processor 675 and/or other processors and modules at the eNB 610 may perform or direct the execution of various processes for the techniques described herein. The controllers/processor 659 and/or other processors and modules at the UE 650 may perform or direct the execution of various processes for the techniques described herein. For example, one or more components of eNB 610 may perform the operations illustrated in FIGS. 9-11, 25, 28, and 30 and/or other processes for the techniques described and illustrated herein. Further, one or more components and modules of UE 650 may perform the operations illustrated in FIG. 12 and/or other processes for the techniques described and illustrated herein.

The memories 676 and 660 may store data and program codes for the eNB 610 and the UE 650, respectively. A scheduler 677 may schedule UEs for data transmission on the downlink and/or uplink.

Linear Precoding in FD-MIMO

Full-dimensional MIMO (FD-MIMO) technology may greatly improve system capacity by using a two-dimensional antenna array with up to 64 antenna ports at an eNB (e.g., eNB 106, 108 of FIG. 1, which may include one more modules of eNB 610 of FIG. 6). Benefits of using up to 64 antenna ports at the eNB may include small inter-cell interference as well as high beamforming gain. The use of a two-dimensional antenna array allows UE-specific beamforming in both azimuth and elevation.

In FD-MIMO systems, the number of transmit antennas at the eNB may be increased, for example, 8 to 10 fold as compared to legacy 8 TX MIMO systems. These extra transmit antennas may bring larger beamforming gains and spray less interference to neighboring cells.

Figure 7:
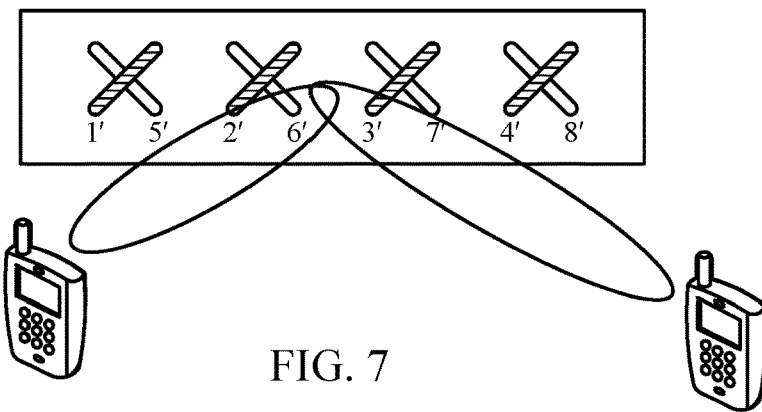
FIG. 7 illustrates an example of a traditional MIMO with one-dimensional antenna array.

FIG. 7 illustrates an example of a traditional MIMO technology with a one-dimensional array of antenna elements. As illustrated, UE-specific beamforming may be performed in azimuth only. A common elevation tilting may be applied.

Figure 8:
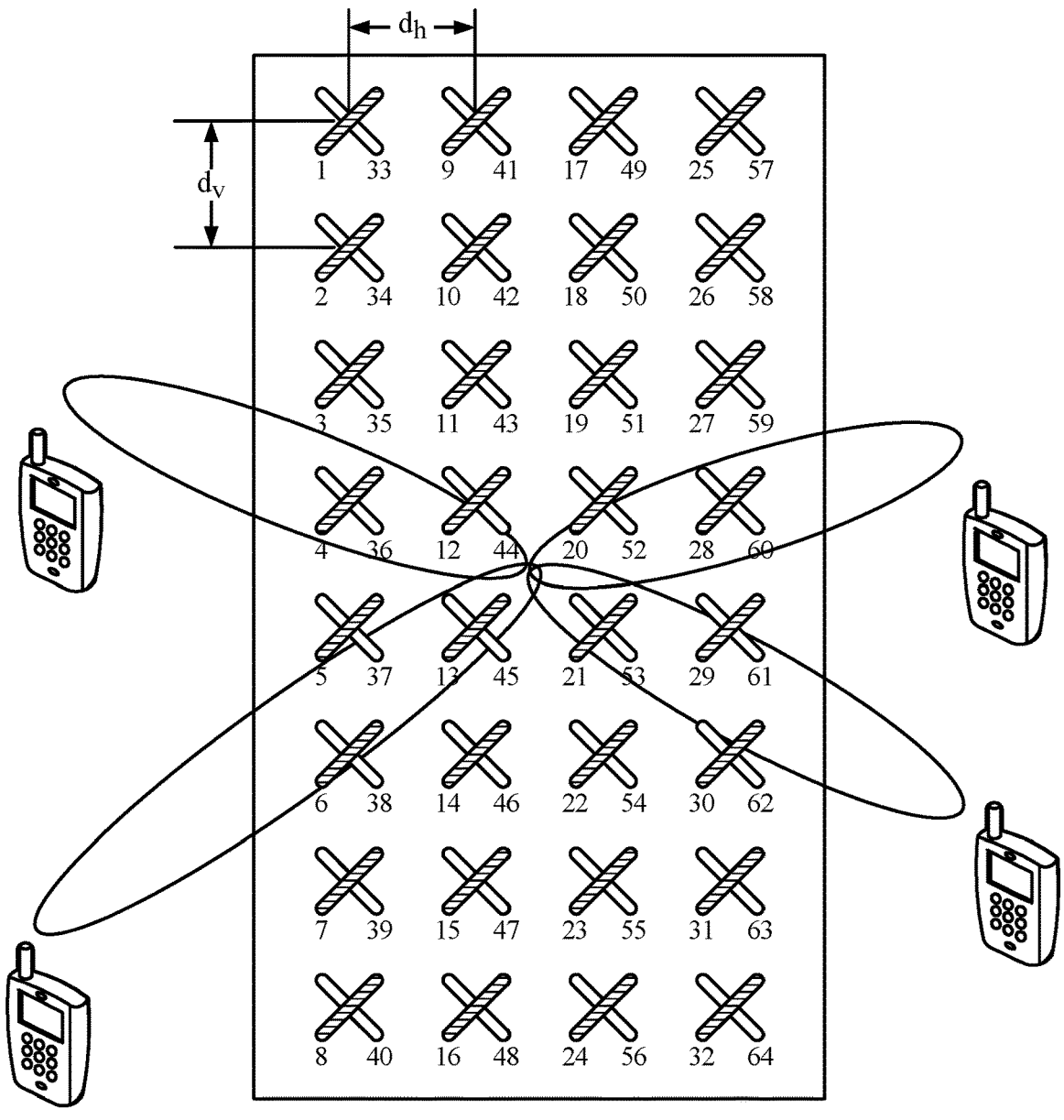
FIG. 8 illustrates an example FD-MIMO with a two-dimensional antenna array, according to aspects of the present disclosure.

FIG. 8 illustrates an example FD-MIMO with a two-dimensional antenna array ($d_H$ and $d_v$), according to aspects of the present disclosure. As illustrated, UE-specific beamforming may be performed in both azimuth and elevation.

In traditional linear precoding, MIMO channel state information (CSI) about the full channel is needed by the eNB. For example, traditional one-shot beamforming/precoding methods rely on the availability of the CSI of the entire transmit dimension (e.g., the instantaneous/statistical knowledge of the channel from each eNB transmit antenna to one or more UE receive antennas are needed).

Such CSI is obtained either by UE PMI/RI feedback or by exploiting channel reciprocity. In TDD systems, the CSI is mainly acquired at the eNB by exploiting bi-directional channel reciprocity. In FDD systems, the CSI is usually measured and quantized at the UE and is then fed back to the eNB via a dedicated uplink channel. In general, the size of the codebook used for CSI quantization increases as the number of transmit antennas at the eNB increases.

The UE PMI/RI reporting may be based on the pilot-aided estimation of the DL full channel. The pilot (or common reference signal) overhead and the complexity of DL channel estimation may be proportional to the number of eNB antennas. Thus, the complexity of PMI/RI selection may increase as the number of eNB antennas increases.

The channel reciprocity approach may be limited by UE capability and UL channel estimation error. For example, for a low-end UE which cannot support sounding antenna switching, short-term CSI about the full channel is unavailable. In addition, the complexity of UL channel estimation and the complexity of calculating beamformer/precoder information may be proportional to the number of eNB antennas.

As described above, in FD-MIMO systems, traditional one-shot beamforming/precoding is problematic due to the increased number of transmit antennas. Thus, a challenge of supporting FD-MIMO is to design efficient beamforming/ precoding algorithms and associated CSI acquisition schemes. In FD-MIMO systems, each antenna is connected to its own RF transceiver. Hence, providing sufficiently accurate CSI via UE feedback may lead to extra overhead at the UE, for example, in terms of channel estimation and the codeword selection.

Accordingly, aspects described herein adopt more efficient beamforming/precoding algorithms and associated CSI acquisition schemes in an effort to reduce the overhead caused by CSI feedback in FD-MIMO systems. As described herein, a two-stage precoding system may be used to reduce the overhead caused by CSI feedback in FD-MIMO systems. The structure of two-dimensional arrays and the channel reciprocity are exploited.

According to aspects, UL channel estimation is used to acquire a long-term port precoding matrix. The port precoding matrix compresses a larger number of antenna elements to a smaller number of antenna ports. Examples of such compression may be seen in FIGS. 14-20. The eNB uses the port precoding matrix to transmit UE-specific port reference signals.

The UE measures short-term CSI on a smaller number of antenna ports instead of the larger number of antenna elements. The UE may quantize the short-term CSI and feed it back to the eNB. The eNB may use the quantized, short-term CSI to map multiple data layers to UE-specific antenna ports (e.g., using a layer precoder). The eNB may use a second stage precoder (e.g., port precoder), which maps each antenna port to antenna elements. In order to support the proposed two-stage precoding scheme, some related signaling are described in more detailed herein.

Figure 9:
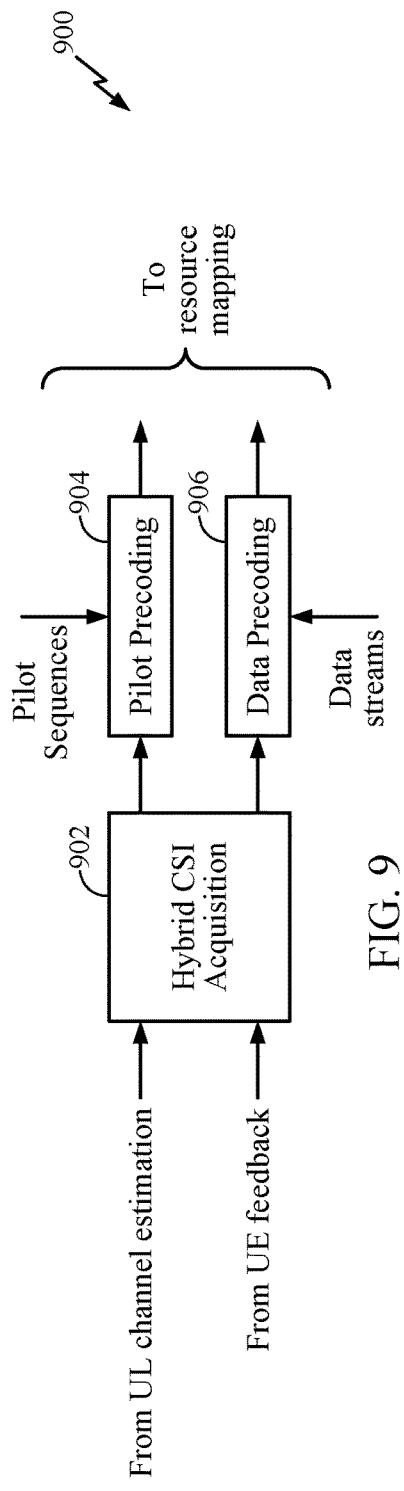
FIG. 9 illustrates example components used in accordance with methods described herein.

FIG. 9 illustrates example components 900 used in accordance with methods described herein. Aspects of the present disclosure contain a Hybrid CSI Acquisition module 902, which provides precoders for data and pilot precoding, a Data Precoding module 906, which precodes data streams to antenna elements, and a Pilot Precoding module 904, which precodes pilot sequences to antenna elements.

According to methods of the present disclosure, both data and pilots are transmitted on a set of antenna ports. The number of antenna ports is much less than the number of antenna elements. Consequently, the overhead and computational complexity at the UE may be reduced significantly.

Figure 10:
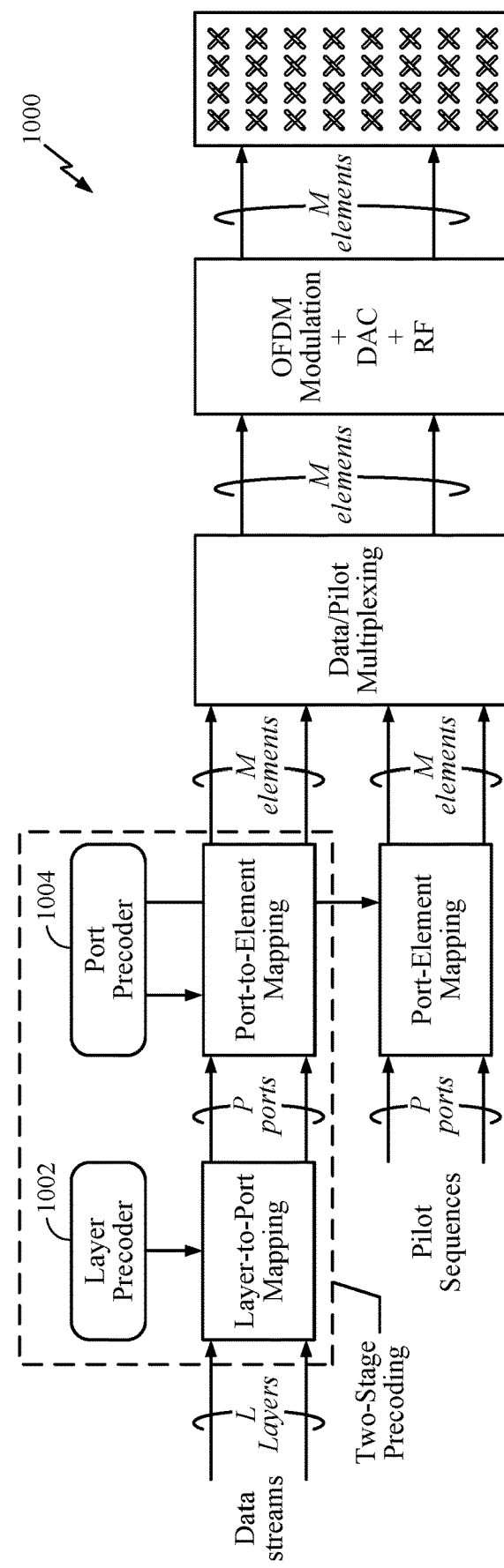
FIG. 10 illustrates an example components used in a two-stage precoding system, accordance with methods described herein.

The Hybrid CSI Acquisition module 902 may generate two precoders, a port precoder and a layer precoder. FIG. 10 illustrates an example 1000 layer precoder 1002 and an example port precoder 1004. The port precoder is used to map a small number of antenna ports to numerous antenna elements and may be obtained by exploiting (long-term) UL channel information. The layer precoder is used to map data layers to antenna ports.

Data precoding (data stream precoding) of FIG. 9 is performed in two consecutive stages, as detailed in FIG. 10. The first stage is a layer-to-port mapping where data streams are first precoded by a layer precoder 1002. The layer precoder 1002 may map, for example, L data layers to P antenna ports.

The second stage is a port-to-element mapping where antenna ports are precoded by a port precoder 1004. The port precoder 1004 may map, for example, P antenna ports to M antenna elements.

According to aspects, pilot sequences for estimating the channels on the P antenna ports are precoded by the same port precoder as used for the data streams, as illustrated in FIG. 10.

Figure 11:
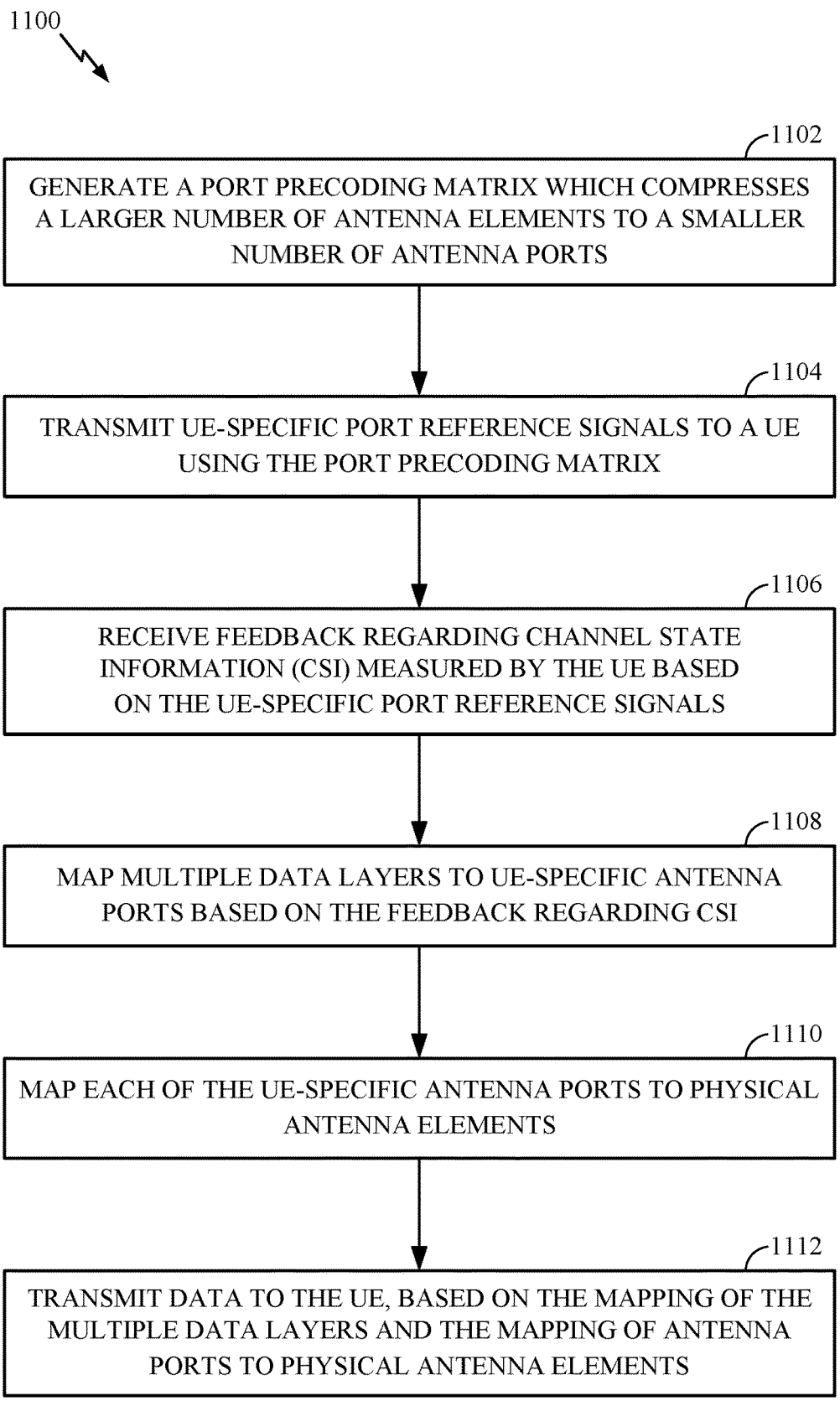
FIG. 11 illustrates example operations performed, for example, by an eNB, in accordance with aspects of the present disclosure.

FIG. 11 illustrates example operations 1100 performed, for example, by an eNB according to aspects of the present disclosure. eNB 106 of FIG. 1, which may include one or more modules of eNB 610 of FIG. 6, may perform the recited operations.

At 1102 the eNB may generate a port precoding matrix which compresses a larger number of antenna elements to a smaller number of antenna ports. At 1104, the eNB may transmit UE-specific port reference signals to a user equipment (UE) using the port precoding matrix. At 1106, the eNB may receive feedback regarding CSI measured by the UE based on the UE-specific port reference signals. At 1108, the eNB may map multiple data layers to UE-specific antenna ports based on the feedback regarding CSI measured by the UE. According to aspects, the eNB may map pilot sequences to UE-specific antenna port. At 1110, the eNB may map each of the UE-specific antenna ports to physical antenna elements. At 1112, the eNB may transmit data to the UE, based on the mapping of the multiple data layers and the mapping of antenna ports to physical antenna elements.

According to aspects, and as described above, the port precoding matrix is generated based on UL channel estimation. The physical transmit antenna elements may be arranged in a multi-dimensional array. As described herein, the eNB may further map pilot sequences to UE-specific antenna ports.

According to aspects, the feedback regarding CSI may comprise quantized feedback which includes at least one of a preferred matrix indicator (PMI) and a rank indication (RI). The quantized feedback may be selected from a predefined codebook.

The eNB may also transmit, to the UE, information regarding a sub-array partition of the antenna elements. Example sub-array partitions are illustrated in FIGS. 14-20. The information may comprise at least one of a type of sub-array partition, a structure of antenna ports, or a number of antenna ports.

According to aspects, the UEs may be divided into multiple categories according to their capability of supporting multiple types of sub-array partition and the associated codebooks. Certain types of UEs may support fewer types of sub-array partitions than other types of UEs.

Figure 12:
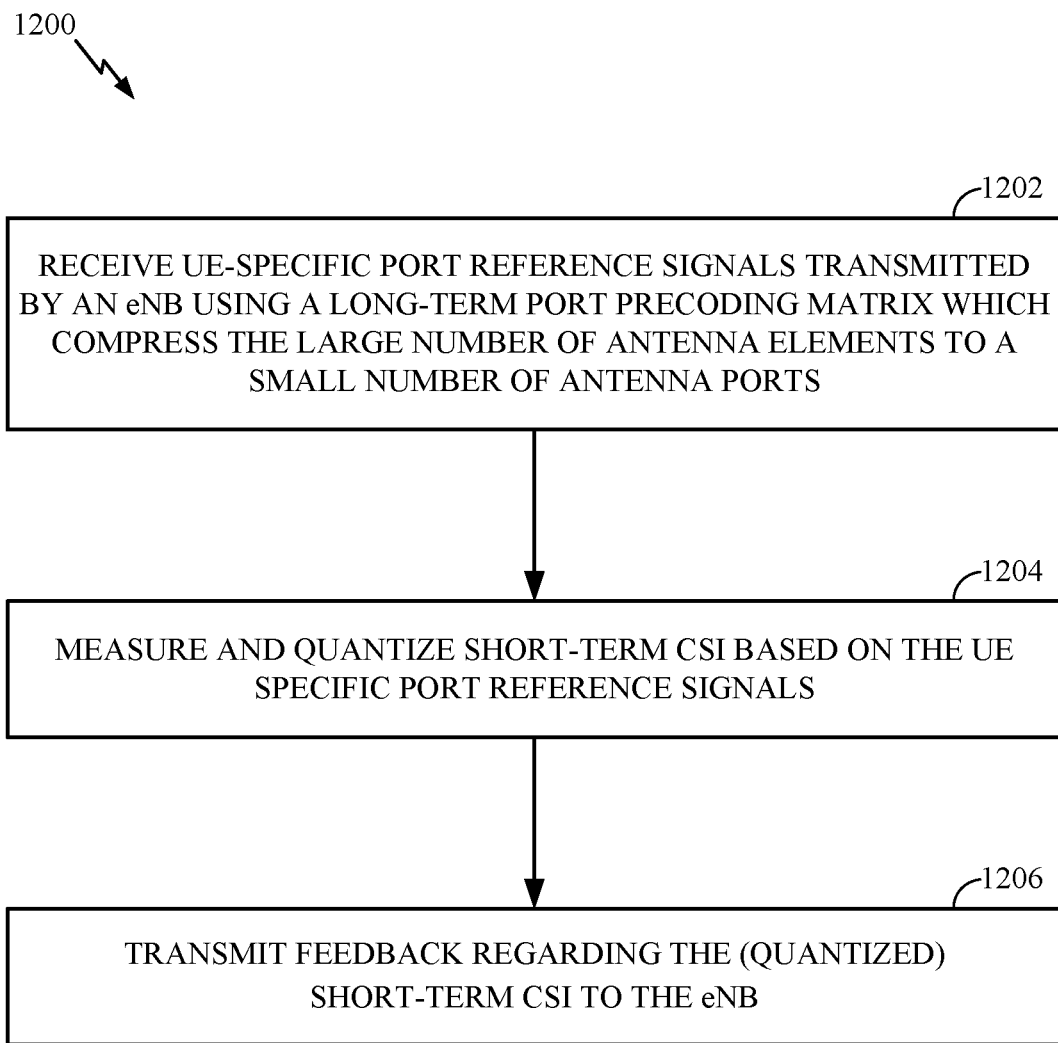
FIG. 12 illustrates example operations performed, for example, by a UE, in accordance with aspects of the present disclosure.

FIG. 12 illustrates example operations 1200 performed, for example, by a UE, according to aspects of the present disclosure. UE 106 of FIG. 1 which may include one or more modules of UE 650 of FIG. 6, may perform the recited operations.

At 1202, the UE may receive UE-specific port reference signals transmitted by an eNB using a long-term port precoding matrix which compresses a larger number of antenna elements to a smaller number of antenna ports. At 1204, the UE may measure and quantize short-term CSI based on the UE-specific port reference signals. At 1206, the UE may transmit feedback regarding the quantized, short-term CSI to the eNB.

According to aspects, the feedback may comprise quantized feedback comprising at least one of a PMI and a RI. The quantized feedback may be selected from a predefined codebook. The UE may select, based on the information, one of a plurality of predefined codebooks, and may use the selected codebook to report the feedback.

According to aspects, the UE may receive information regarding a sub-array partition of the antenna elements. The information may comprise at least one of a type of sub-array partition, a structure of antenna ports, and a number of antenna ports. Example sub-array partitions are illustrated, for example, in FIGS. 14-20. The UE may receive the information regarding the sub-array partition, for example, from an eNB.

Figure 13:
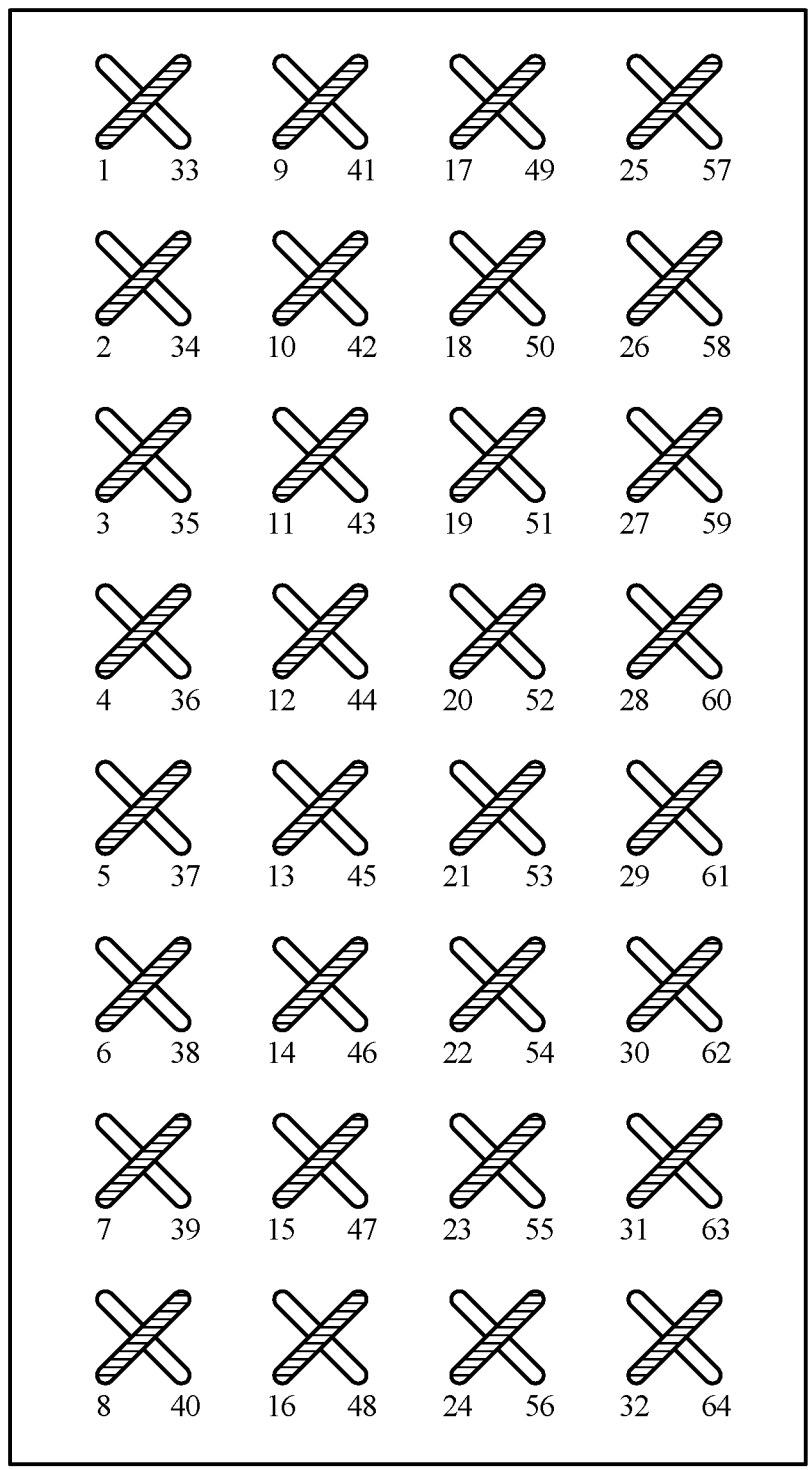
FIG. 13 illustrates an example array of antenna elements, according to aspects of the present disclosure.
Figure 14:
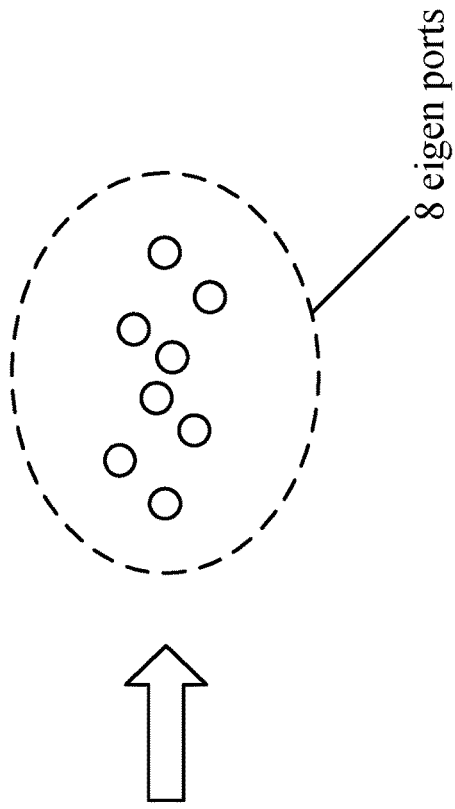
FIGS. 14-20 illustrate example sub-array partitions wherein a larger number of antenna elements are compressed to a smaller number of antenna ports.
Figure 14:
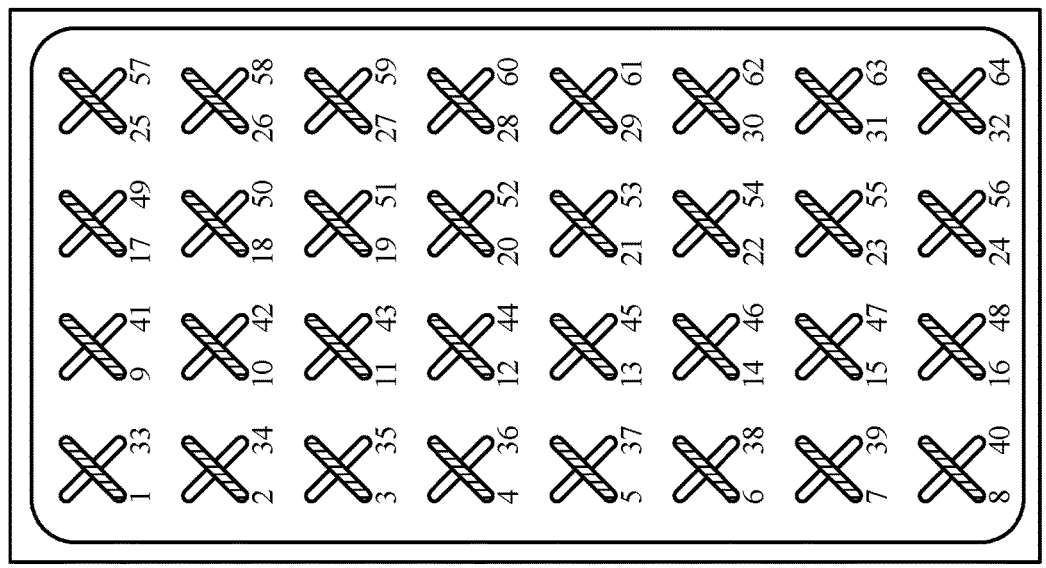
Figure 15:
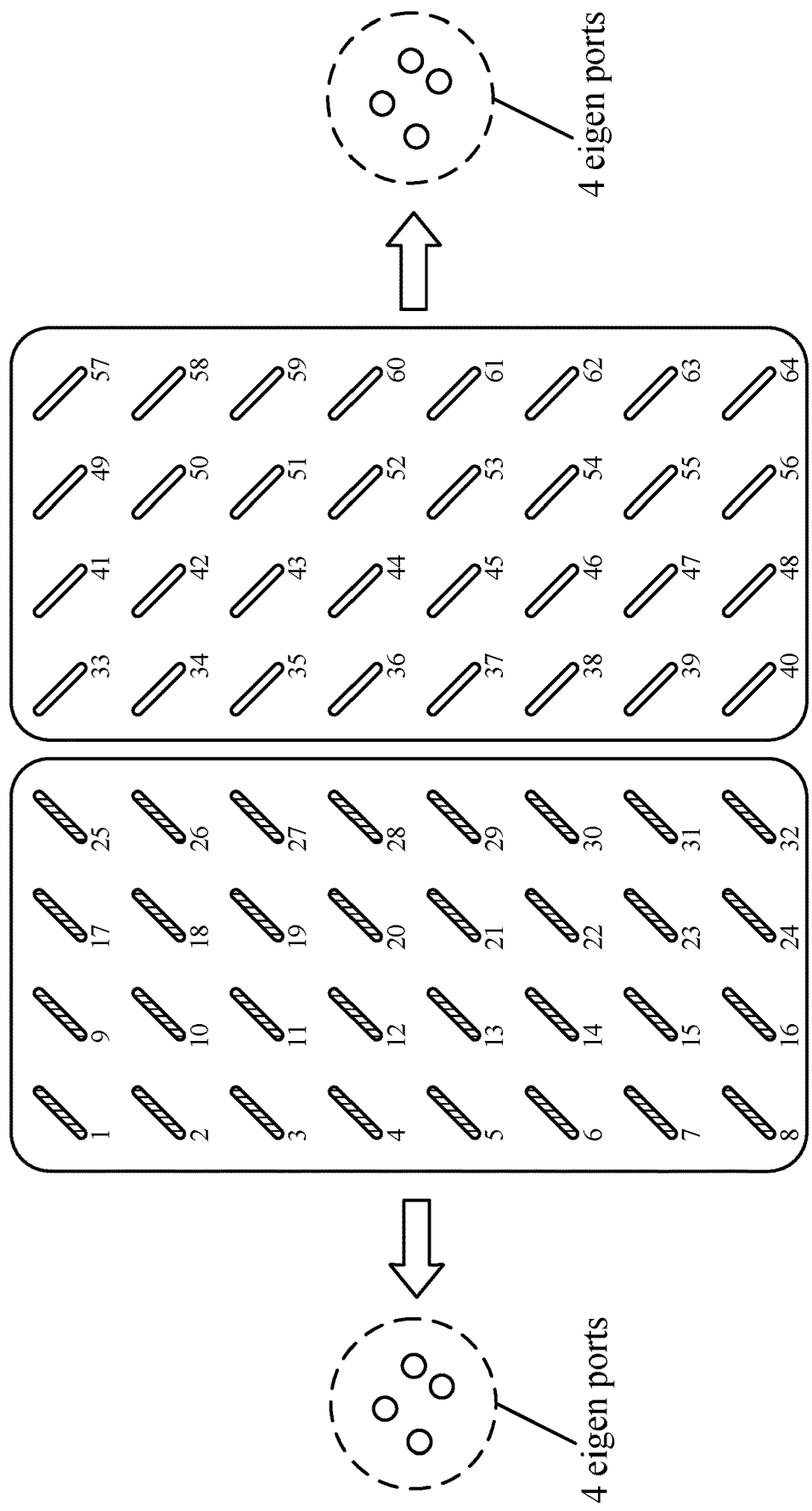
Figure 16:
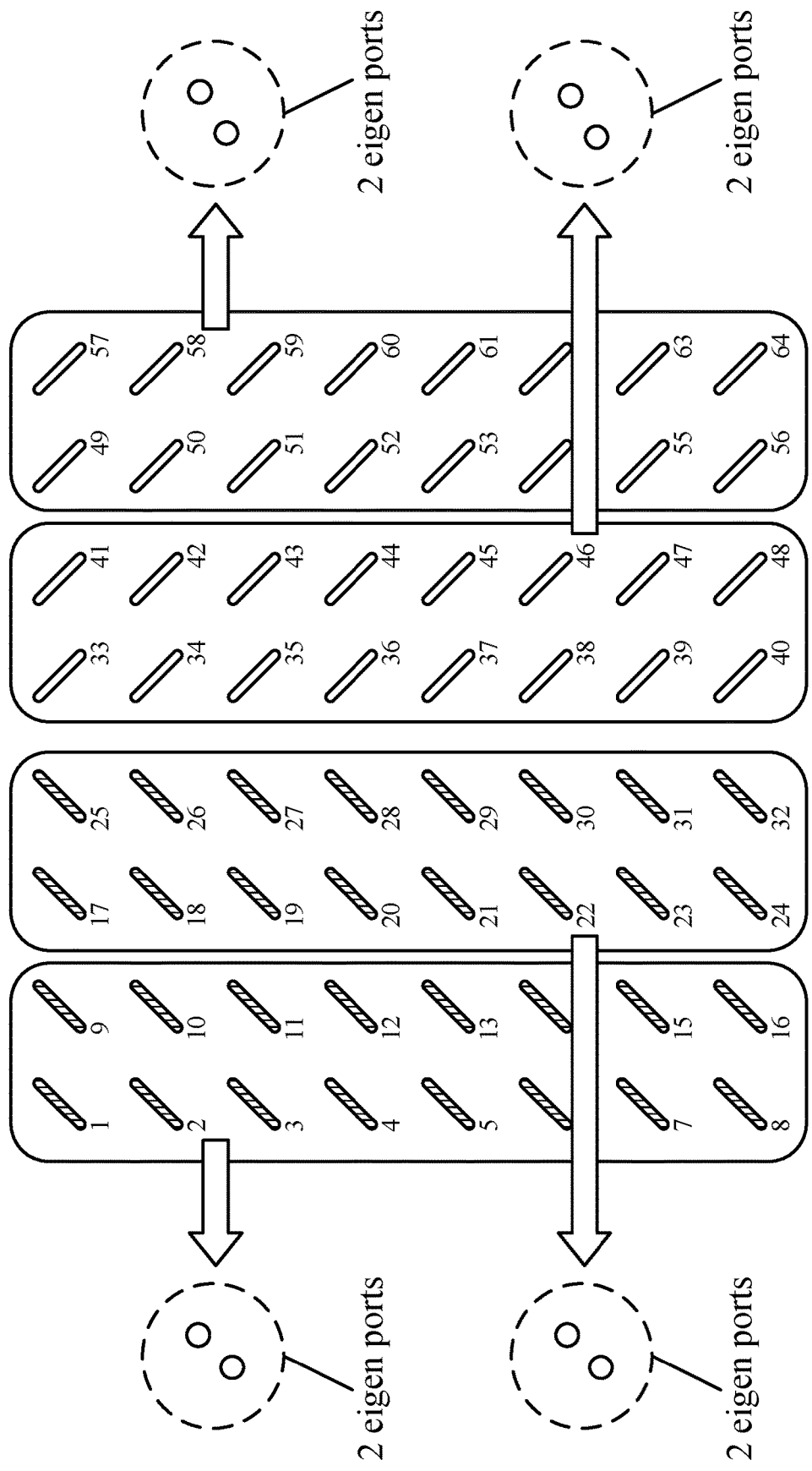
Figure 17:
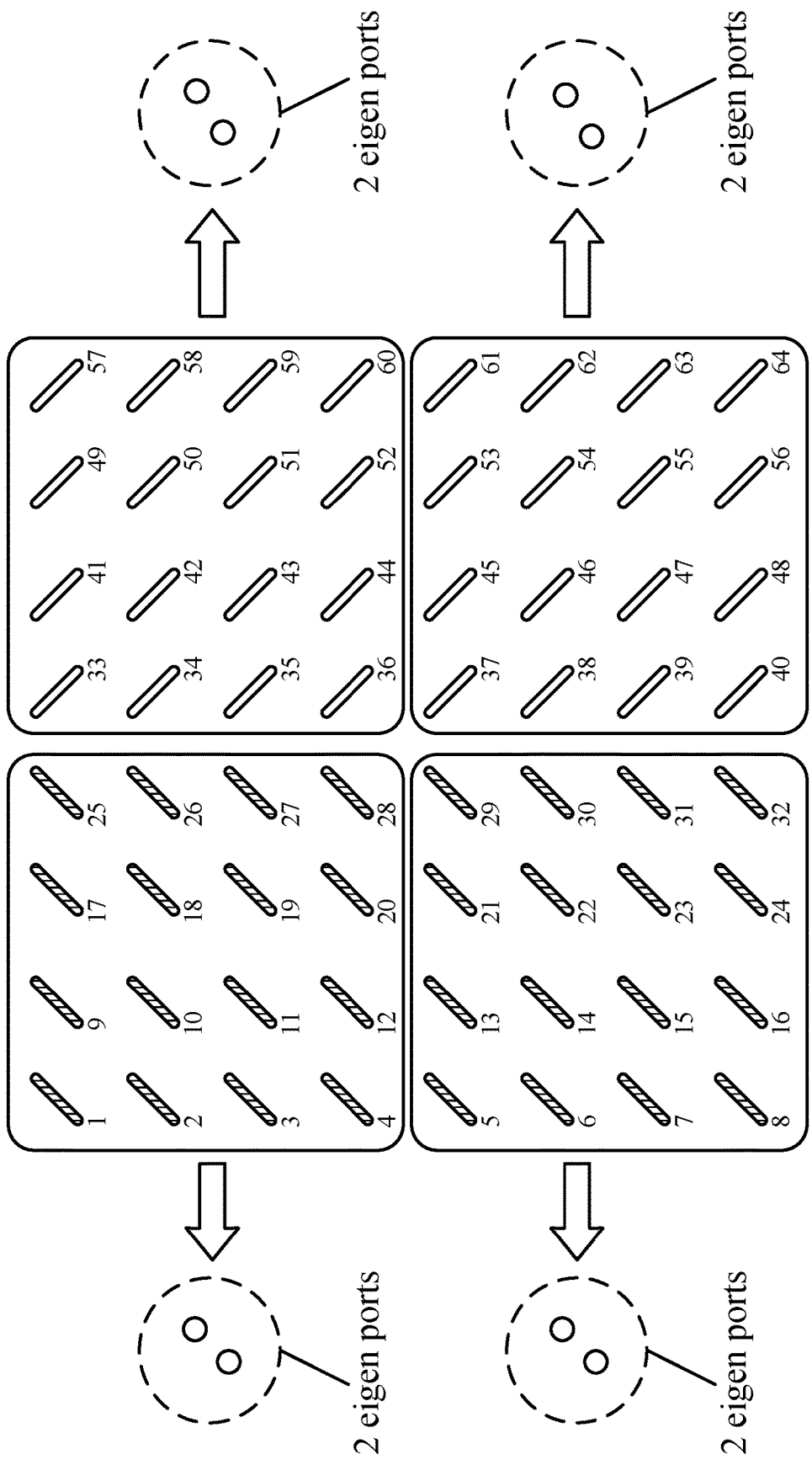
Figure 18:
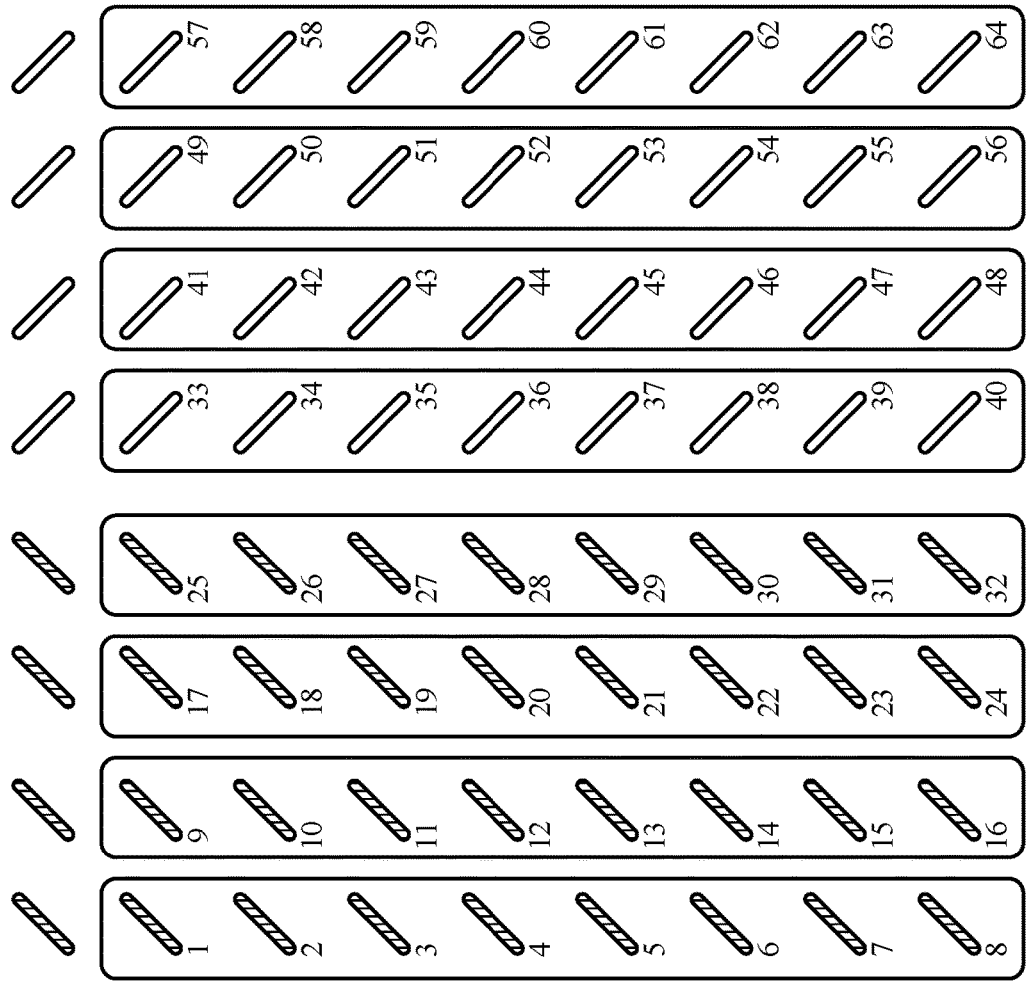
Figure 19:
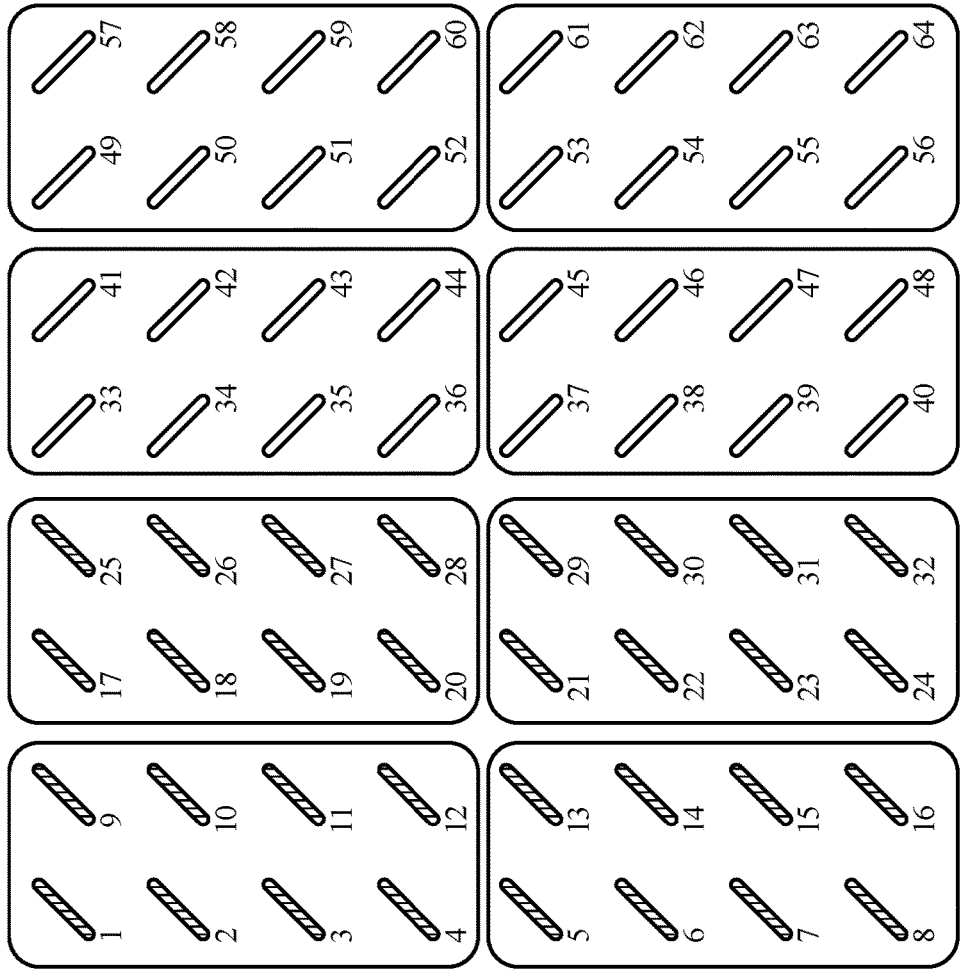
Figure 20:
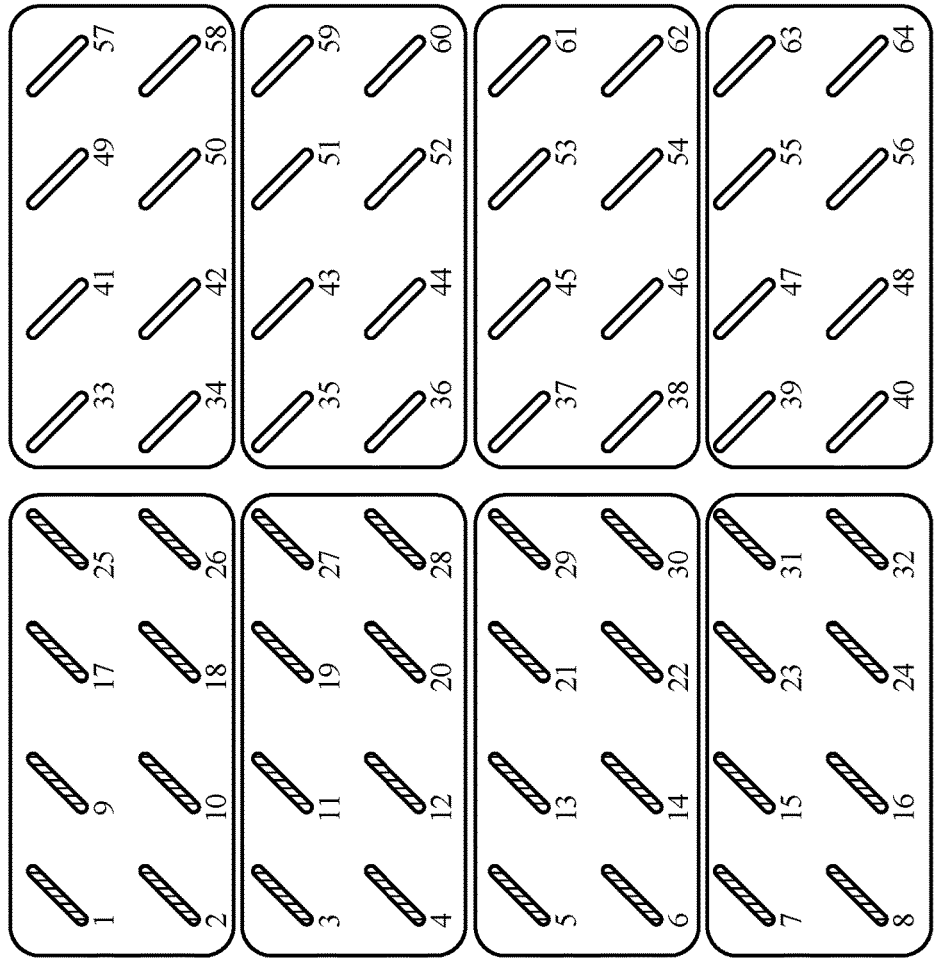

FIG. 13 illustrates an example array of antenna elements, according to aspects of the present disclosure. FIG. 13 illustrates 64 antenna elements, M, and 8 antenna ports, P. The illustrated cross-polarized antenna elements are aligned in 8 rows by 8 columns.

FIGS. 14-20 provide example sub-array partitions of antenna elements, according to aspects of the present disclosure. A UE may receive information, from an eNB, for example, regarding a sub-array partition of the antenna elements. The sub-arrays may compress a larger number of antenna elements to a smaller number of antenna ports.

Thus, aspects of the present disclosure provide techniques to improve system capacity of FD-MIMO technology by using a two-dimensional antenna array with up to 64 antenna ports at the eNB. The use of a two-dimensional antenna array allows UE-specific beamforming in both azimuth and elevation.

In order to support the two-stage precoding scheme described herein, UE-specific parameters, including the type of sub-array partition and the CSI resource configuration may be semi-dynamically configured. The type of sub-array partition may include the structure of the antenna port and the number of antenna ports used by the eNB.

Based on the above configuration, the UE may select one out of several predefined codebooks and use the selected codebook to report feedback, for example, PMI/RI, for the layer precoder. UEs may be divided into multiple categories according to their capability of supporting multiple types of sub-array partition and the associated codebooks. According to aspects, low-end UEs may support limited types of sub-array partitions.

Dynamic Vertical Sectorization

In order to increase system capacity, three-dimensional (3D)-MIMO technology has been considered, in which an eNB uses a two-dimensional (2D) antenna array with a large number of antennas. With this type of configuration, small intra-cell interference would be expected with a high beamforming gain.

Beamforming has typically been implemented using only horizontal directioning. However, with the increase in smart antenna technologies, elevation beamforming now allows for vertical directioning in the beamforming process. Elevation beamforming currently supports up to 8 antenna ports.

Figure 21:
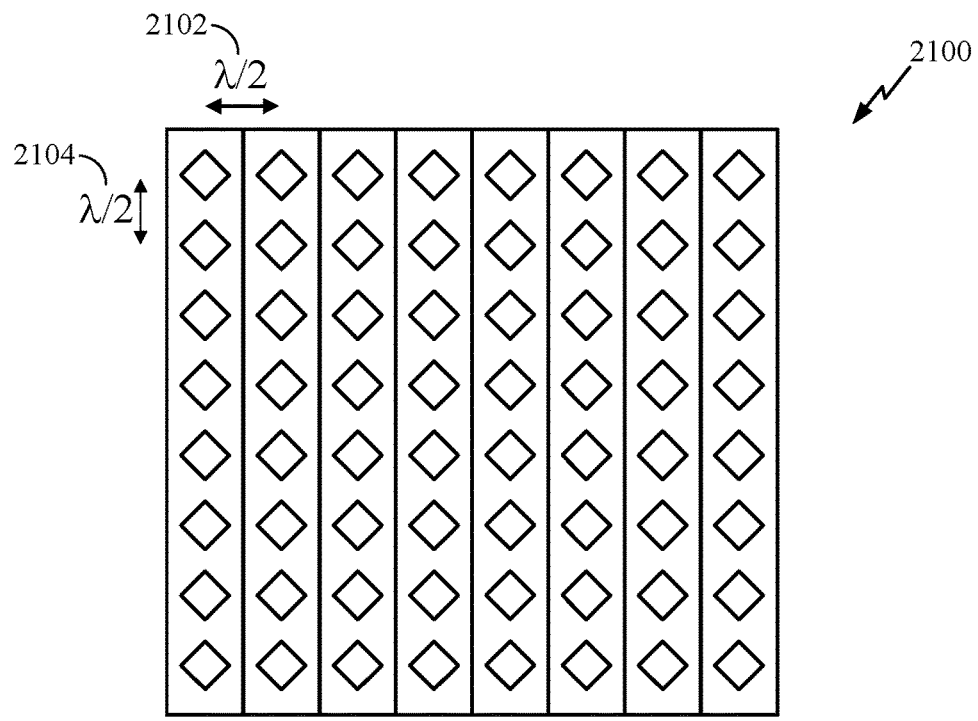
FIG. 21 illustrates an example 8×8 antenna array at an eNB.

FIG. 21 illustrates an 8×8 antenna array 2100. Antenna array 2100 includes 8 rows and 8 columns of antenna elements, each separated from an adjacent antenna element by a distance of X/2, where X is the wavelength of the signal from the antenna elements. Antenna array 2100 includes azimuth elements in direction 2102 and elevation elements in direction 2104 that may be used in both horizontal and elevation beamforming. In various implementations of antenna array 2100, each antenna element may include an individual transceiver and power amplifier.

Figure 22:
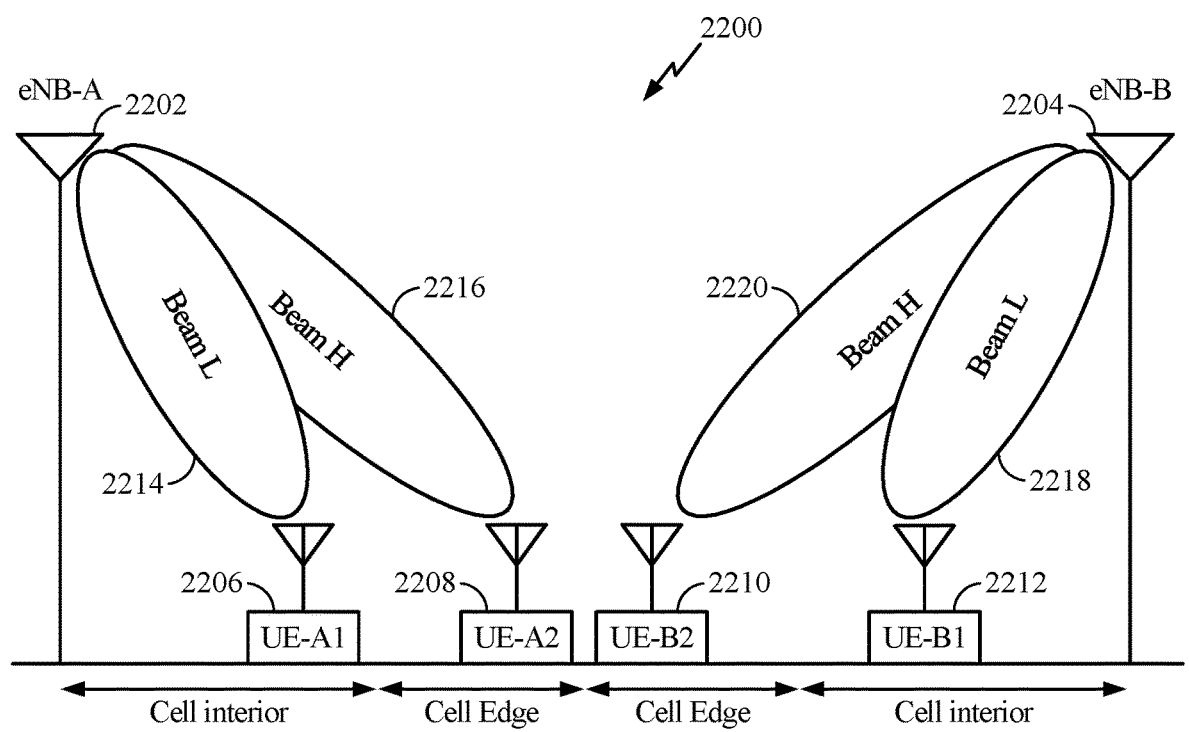
FIG. 22 illustrates a wireless network area having two eNBs that provide conventional vertical sectorization coverage.

FIG. 22 illustrates a wireless network area 2200 having eNB-A 2202 and eNB-B 2204 which provide conventional vertical sectorization coverage. Elevation beamforming currently employs vertical sectorization in which the beams are formed at fixed elevations over the coverage area.

For example, eNB-A 2202 is configured with beam L 2214 and beam H 2216 in a vertical sectorization of the coverage area of eNB-A. Similarly, eNB-B 2204 is configured with beam L 2218 and beam H 2220, in a vertical sectorization of the coverage area of eNB-B.

Some of the problems with such conventional vertical sectorization, such as the provision of beams L 2214 and 2218 and beams H 2216 and 2220, are that the fixed elevation beam causes loss degree of freedom (DOF) in the elevation domain, and the loss of flexibility.

Beams H 2216 and 2220 are intended for coverage of UEs at the cell edge, such as UEs 2208 and 2210, while beams L 2214 and 2128 are intended for coverage of UEs at the cell interior, such as UEs 2206 and 2212.

However, if UEs at the cell edge 2208 and 2210 were not present and additional UEs were located in the cell interior, cell capacity may be limited because eNB-A 2202 and eNB-B 2204 would unnecessarily maintain beams H 2216 and 2220, even though no UEs were located within the cell edges. In such cases, the beams 2216 and 2220 will be wasted. Moreover, without flexibility in elevation, conventional vertical sectorization may not be feasible for a scenario with UEs located at different elevations.

Figure 23:
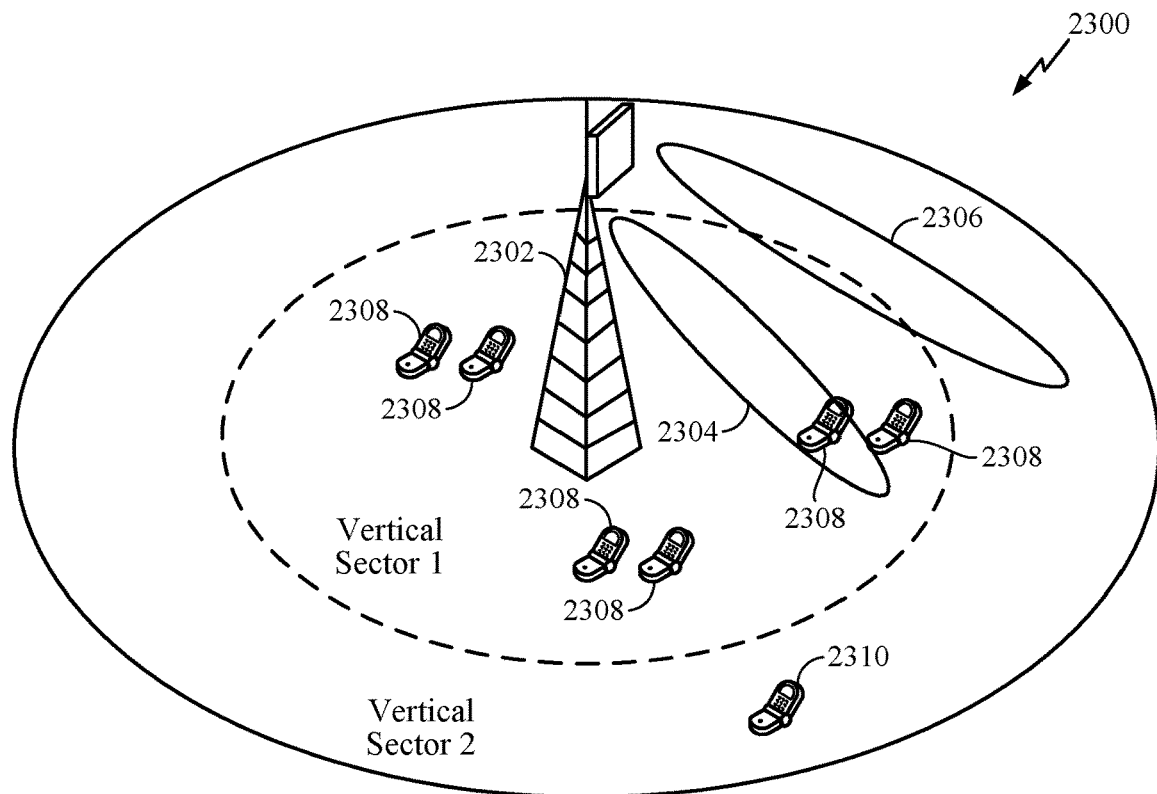
FIGS. 23 and 24 illustrate a wireless coverage area serviced by an eNB.

FIG. 23 illustrates a wireless coverage area 2300 serviced by eNB 2302. eNB 2302 employs fixed vertical sectorization with beams 2306 and 2304. Beam 2304 provides elevation coverage of vertical sector 1 and beam 2306 provides elevation coverage of vertical sector 2.

As indicated, with the fixed vertical sectors, beams may be wasted when few UEs occupy the defined vertical sectors (e.g., vertical sectors 1 and 2). For example, vertical sector 1 includes a plurality of UEs 2308. However, only UE 2310 is located in vertical sector 2. The eNB 2302 may expend system resources in maintaining beam 2306 for coverage of only UE 2310 within vertical sector 2. Even though many more UEs 2308 are located within vertical sector 1, the eNB will not be able to expand beam 2304 to increase the capacity of vertical sector 1.

Figure 24:
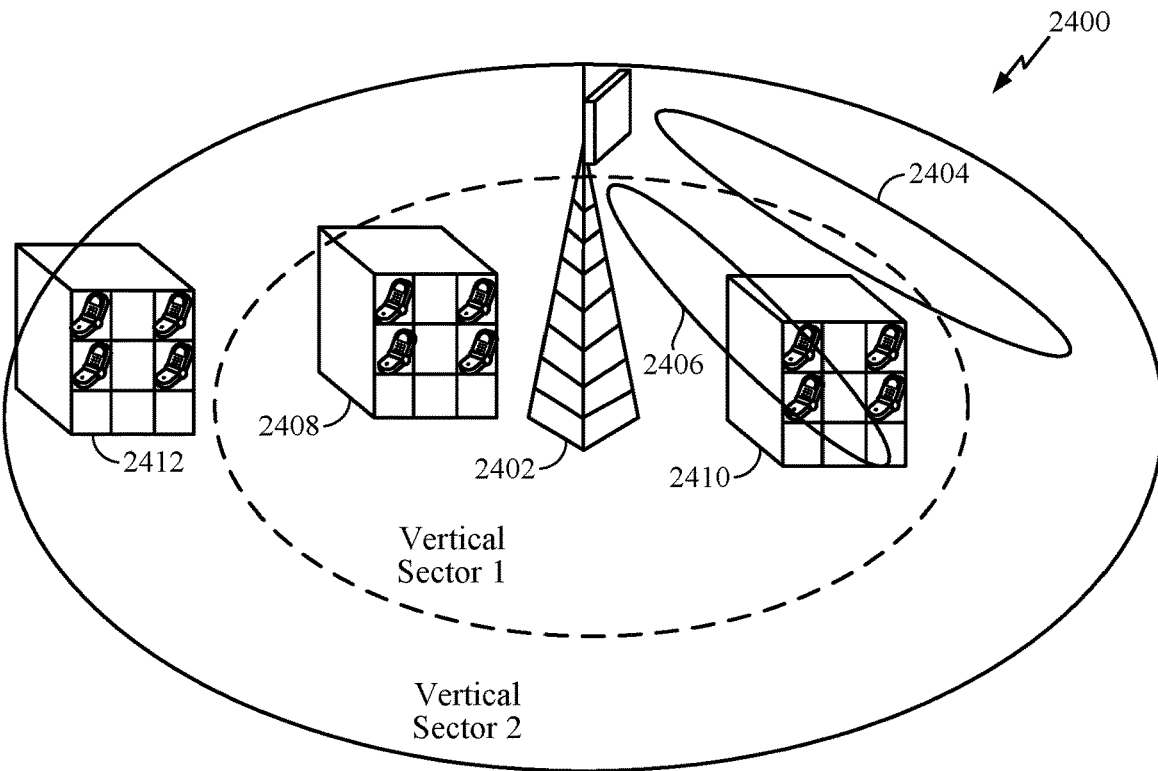

FIG. 24 illustrates a wireless coverage area 2400 serviced by eNB 2402. eNB 2402 employs vertical sectorization with beams 2404 and 2406. Beam 2406 provides elevation coverage of vertical sector 1 and beam 2404 provides elevation coverage of vertical sector 2. The illustrated fixed vertical sectors also limit the flexibility to cover UEs having elevation differences.

For example, buildings 2408 and 2410 are located within vertical sector 1, while building 2412 is located within vertical sector 2. As illustrated, each of the buildings is multistory. Thus, UEs located within these buildings may have elevation differences. Beam 2404, providing coverage to vertical sector 2 may not be capable of providing service to the UEs at a different elevation in buildings 2408 and 2410 within vertical sector 1. Accordingly, the illustrated fixed vertical sectorization would likely limit flexibility to cover UEs having different elevations.

Various aspects of the present disclosure are directed to perform elevation beamforming by dynamically forming several vertical sectors based on UE feedback in the elevation domain. For example, UEs with similar feedback in the elevation domain may be grouped to form a cluster. The serving eNB may form a cluster-specific vertical beam for these UEs based on the received feedback. As will be described in more detail herein, the eNB may form cluster-specific vertical beams for UEs which provide similar feedback.

According to aspects, the vertical sectors may be changed dynamically after a certain period. Since a UE changing elevation is a slow statistical property, the designed period for changing the vertical sectors may be defined as a longer period of time. Moreover, as UEs move from one location to another, the UEs may join other vertical clusters when their elevation domain feedback associates with another particular vertical cluster.

Figure 25:
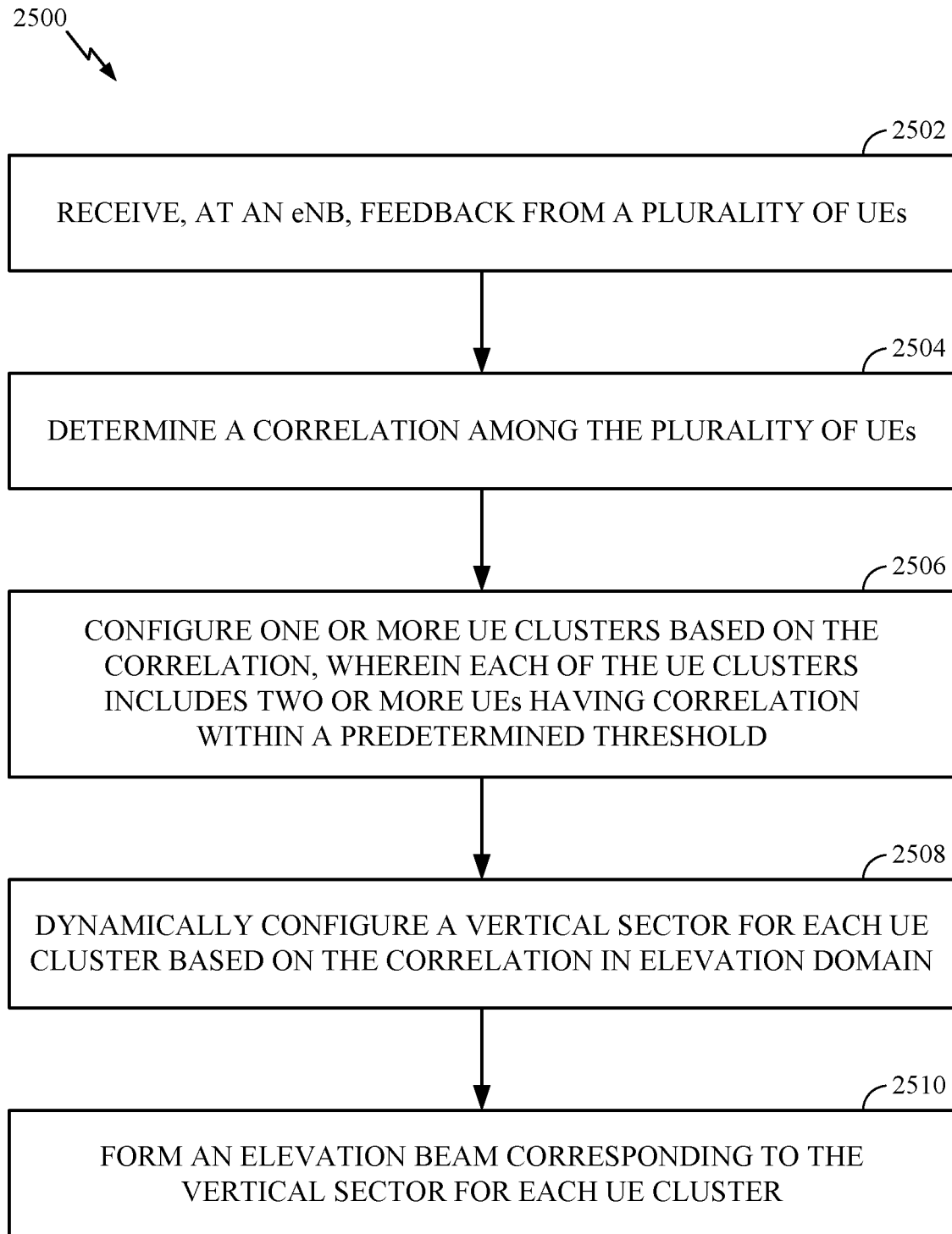
FIG. 25 illustrates example operations performed, for example, by an eNB, according to aspects of the present disclosure.

FIG. 25 illustrates example operations 2500 performed according to aspects of the present disclosure. Operations 2500 may be performed by one or more modules of an eNB. As described above, the eNB may utilize a two-dimensional antenna array.

At 2502, the eNB receives feedback from multiple UEs within its coverage area. As will be described in more detail herein, the UE may receive feedback according to an open-loop scheme, a closed-loop scheme, or combination of both. The feedback may be received at the eNB from a physical uplink control channel and/or a physical uplink shared channel.

In an open-loop scheme, the eNB may form multiple orthogonal elevation beams for the UEs. The UE may analyze the beams and provide feedback to the eNB by means of designating (e.g., transmitting) an index of the preferred beam.

In a closed-loop scheme, the feedback received by the base station may be a metric obtained or calculated by the UEs. The metric may include a precoding matrix indicator (PMI), channel eigenvector, or the like.

At 2504, the eNB may determine a correlation in the elevation domain among the UEs using the feedback received at step 2502. The correlation provides for an ability of the eNB to group the UEs into logical clusters that would benefit from an elevation beam formed based on the feedback.

Depending on whether the eNB operates using an open-loop or closed-loop scheme, the correlation may include analyzing the distribution of preferred beam indices reported by the UEs (open-loop scheme) or may include determining the correlation between the various feedback metrics in order to determine the logical grouping of UEs (closed-loop scheme).

At 2506, the eNB may configure one or more UE clusters based on the correlation, wherein each cluster of UEs includes a set of UEs that have a similar correlation or, which are correlated within a predetermined threshold.

At 2508, the eNB may dynamically configure a vertical sector for each of the UE clusters based on the resulting correlation among the UEs in the elevation domain. For example, when the eNB determines that the feedback of a number of UEs are correlated together and have been configured as a UE cluster, the eNB may define and configure a vertical sector that will service each of the correlated UEs in that UE cluster. The eNB may dynamically configure such a vertical sector for each such UE cluster formed by UEs with a certain similar correlation.

At 2510, the eNB may form an elevation beam corresponding to the vertical sector for each configured UE cluster. Each elevation beam may be orthogonal to other elevation beams. The eNB may generate the appropriate beam weighting in order to form the beam that will serve the dynamic vertical sector for each UE cluster. Each vertical sector may have a beamforming weight equal to a principal eigenvector of a composite channel. The composite channel may be formed based on the feedback in the elevation domain received from UEs in each of the UE clusters. The eNB may transmit the elevation beam to the two or more UEs in each of the one or more clusters. The elevation beam may be transmitted using a time multiplexing method or a frequency multiplexing method.

According to aspects, the elevation beam for each cluster of UEs may be orthogonal to each other. Further, the elevation beam may be transmitted by one or more of a time multiplexing method or a frequency multiplexing method.

Various aspects of the present disclosure also allow a compatible eNB to reserve some beams for UE-specific elevation beamforming. For any given coverage area, a tradeoff may exist between cluster-specific beams and UE-specific beams. The UE-specific beams may provide stronger communications for an individual UE, while the cluster-specific beams may provide a marked increase in system capacity. The open-loop and closed-loop schemes utilized for cluster-specific beamforming may also be used to determine a UE that may not fall into a logical cluster and may benefit from a UE-specific beam.

Figure 26:
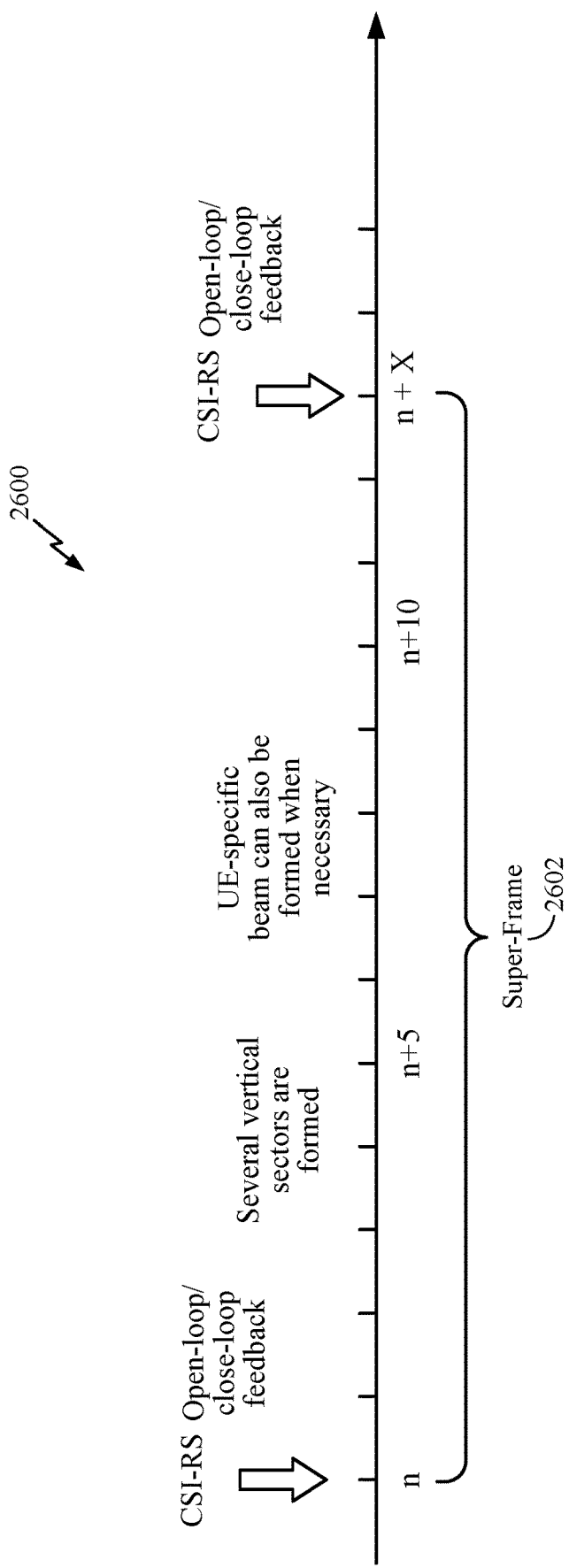
FIG. 26 illustrates a transmission timeline for dynamic vertical sectorization, according to aspects of the present disclosure.

FIG. 26 illustrates transmission timeline 2600 illustrating a dynamic vertical sectorization procedure configured according to aspects of the present disclosure. As illustrated, a periodic super-frame may be defined consisting of tens of frames. Super-frame 2602 is illustrated on transmission timeline 2600 including "X" number of frames.

At the first subframe, "n," the eNB transmits a reference signal. For example, the eNB may transmit a channel quality information-reference signal to a plurality of UEs. Each UE measures its channel in CSI-RS and provides feedback in the elevation domain back to the eNB. The scheme used by the eNB and UEs may be open-loop, closed-loop, or a combination of both. As described above, in an open-loop mode, the UEs feedback the index of the best of the orthogonal elevation beams. In a closed-loop mode, the UEs feedback a metric, such as the rank-1, PMI, channel eigen vector or the like.

The eNB collects the channel information fed back in the elevation domain from the UEs and forms dynamic vertical sectors for a cluster of UEs based on a correlation of the open-loop, closed-loop feedback, or combination of both.

As noted above, UE-specific beamforming may still be applicable for UEs that do not fit within a correlated cluster of UEs.

The formed vertical sectors will then not change until the end of super-frame 2602 at frame "n+X." At this time, the eNB may, again, transmit a RS and UEs in the coverage areas of the eNB may provide feedback in the elevation domain to the eNB using either an open-loop or closed-loop scheme.

It should be noted that the overhead that would be used by the eNB to transmit the RS (e.g., CSI-RS) for elevation feedback from the UE is very low. Accordingly, the illustrated aspects of the present disclosure would not substantially increase the overhead or processing requirements of the base station or UEs.

Figure 27:
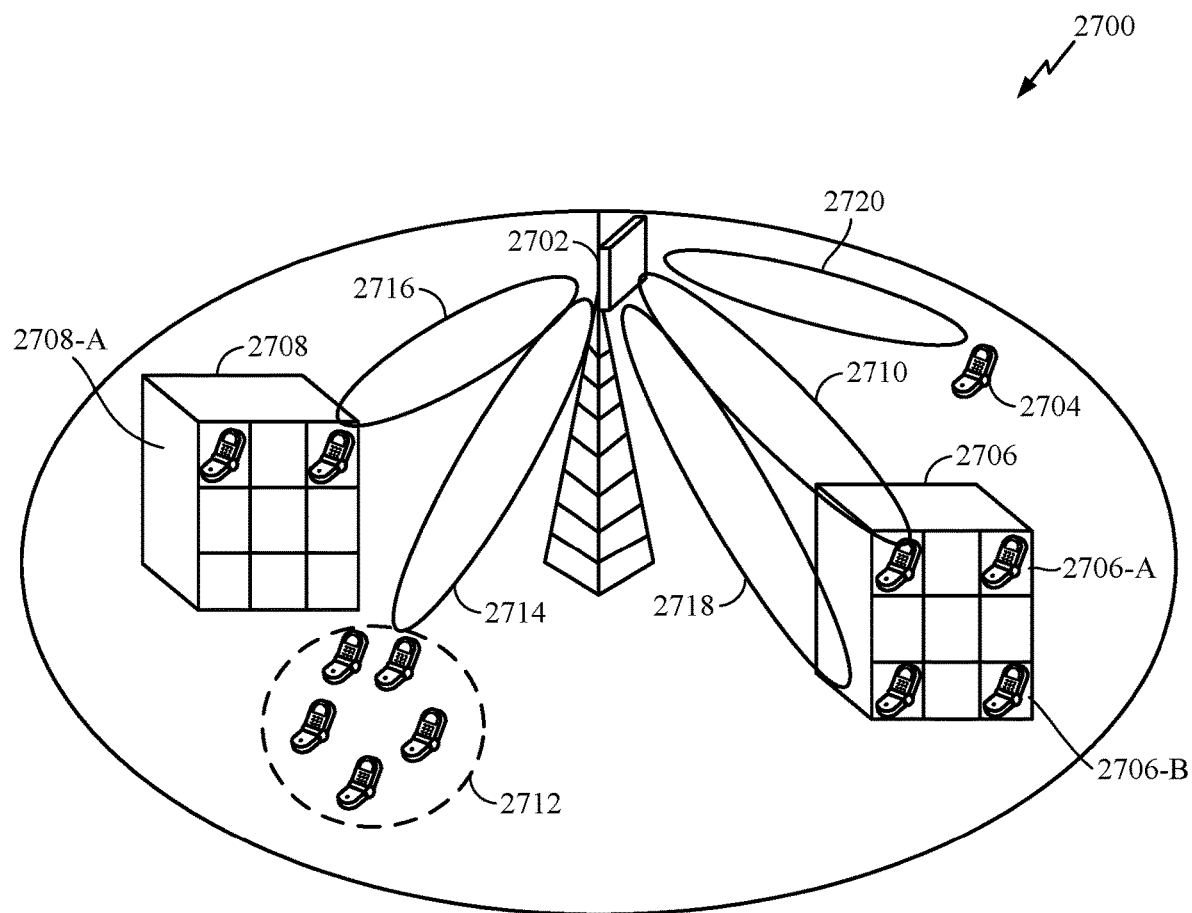
FIG. 27 is illustrates a coverage area of an eNB configured for dynamic vertical sectorization, according to aspects of the present disclosure.

FIG. 27 illustrates a coverage area 2700 of an eNB 2702 configured according aspects of the present disclosure. eNB 2702 is configured for dynamic vertical sectorization and begins the sectorization process by transmitting CSI-RS for elevation feedback from the UEs located within coverage area 2700.

Multiple UEs are located within the coverage area of eNB 2702, including UE 2704, UEs 2706-A, 2706-B on various floors of building 2706, and UEs 2708-A in building 2708. The UEs within coverage area 2700 each provide feedback to the eNB in the elevation domain. The eNB correlates the feedback to dynamically determine vertical sectors.

Building 2706 includes UEs on the third floor 2706-A and UEs on the first floor 2706-B. The correlation of the elevation feedback for the UEs in building 2706 cause the eNB to configure a vertical sector 2710 for the cluster of UEs on the third floor and a vertical sector 2718 for the cluster of UEs on the first floor of building 2706.

The eNB also finds a correlation between multiple UEs outdoors in coverage area 2700. The eNB defines a UE cluster 2712 and a vertical sector 2714 associated with the UE cluster 2712. The correlation of the elevation feedback for the UEs in building 2708 cause the eNB to configure a vertical sector 2716 for the cluster of UEs on the third floor building 2708

Finally, the elevation feedback received from UE 2704 may not correlate with any of the other UEs located within coverage area 2700. Accordingly, the eNB may configure a UE-specific elevation beam 2720 to serve UE 2704.

This distribution of UEs and the resulting dynamic vertical sectorization implemented by eNB 2702 may remain in place for tens of frames, as described in FIG. 26. Moreover, as any UE in any vertical sector moves into another vertical sector, it may become a part of that particular cluster of UEs.

For example, if one of the UEs on the third floor of building 2706 moves to the first floor of the building, the UE will leave the cluster of UEs for which vertical sector 2710 was configured and join the cluster of UEs on the first floor 2706-B for which vertical sector 2718 was configured. Accordingly, by dynamically configuring vertical sectors based on feedback from the UEs in the elevation domain, the eNB may more flexibly handle UEs having varying elevations without wasting system capacity through fixed vertical sectors.

As noted above, the elevation feedback mechanisms may be implemented in various aspects of the present disclosure using an open-loop scheme, a closed-loop scheme, or some combination or variation of both.

Figure 28:
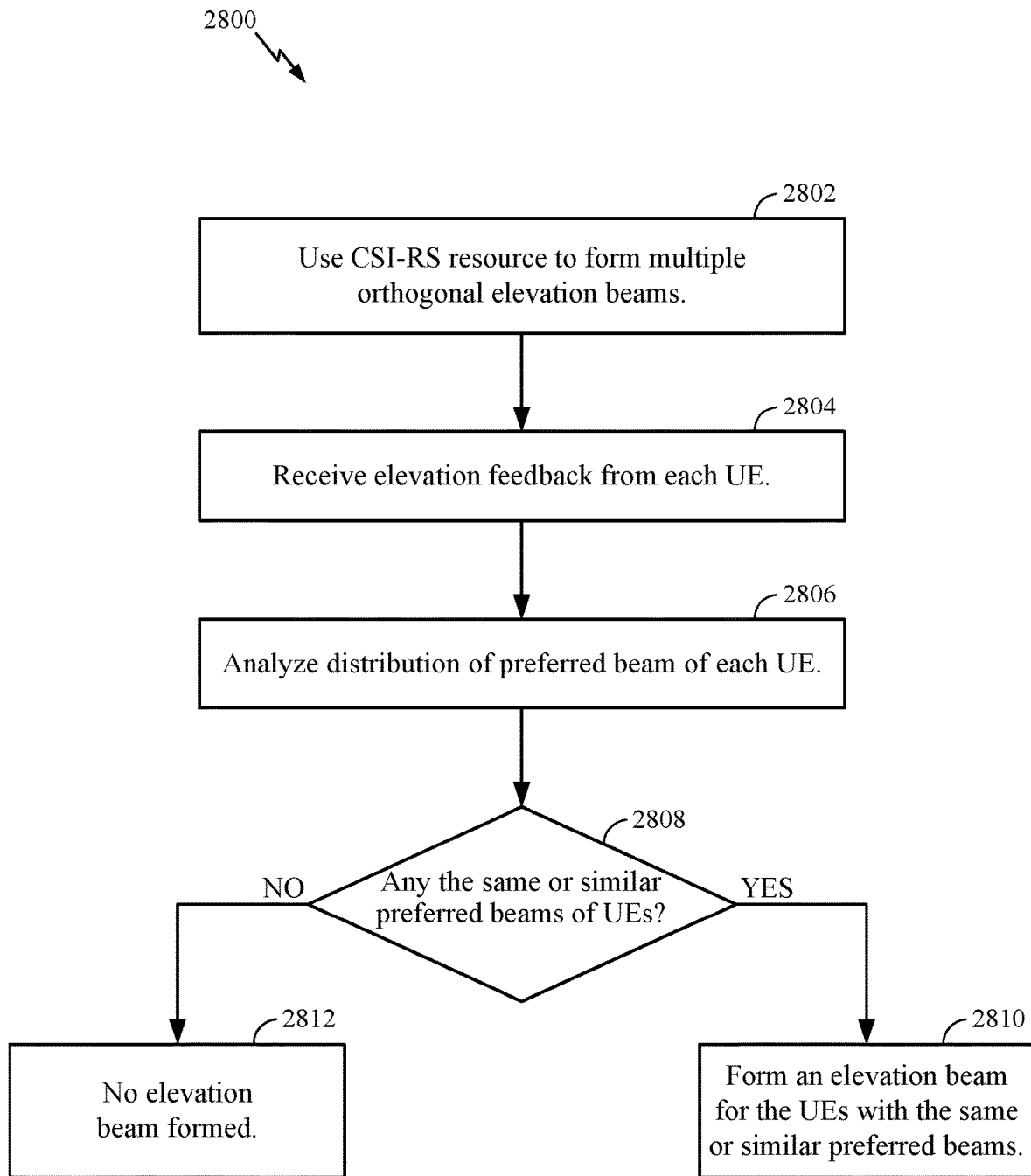
FIG. 28 illustrates example operations executed by an eNB to implement an open-loop elevation feedback scheme according to aspects of the present disclosure.
Figure 29:
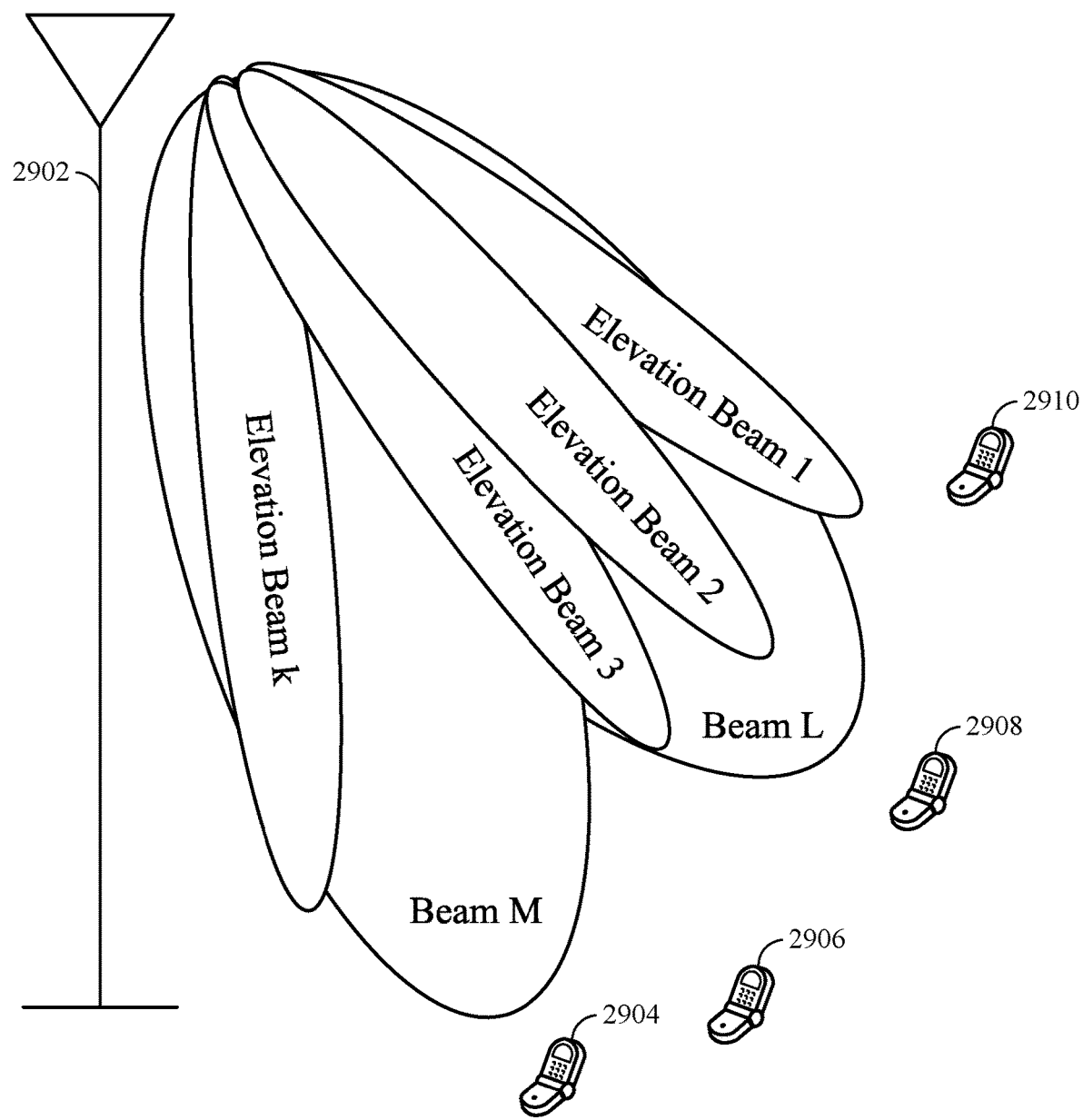
FIG. 29 illustrates an eNB configured for an open-loop elevation feedback according to aspects of the disclosure as described, for example, in FIG. 28.

FIG. 28 illustrates example operations 2800 executed to implement an open-loop elevation feedback scheme according aspects of the present disclosure. FIG. 29 illustrates an eNB 2902 configured for an open-loop elevation feedback mechanism according the methodology illustrated in FIG. 28.

At block 2802, eNB 2902 uses a common CSI-RS resource to form multiple orthogonal elevation beams, elevation beam 1 through elevation beam K, on a time and frequency multiplexing method.

At 2804, eNB 2902 receives elevation feedback from each of UEs 2904-2910. Each of the UEs 2904-2910 feeds back the index of one of elevation beams 1 to K that is its best beam in the elevation domain.

For example, UE 2904 may feedback index K of elevation beam K, while UE 2908 may feedback index 2 of elevation beam 2, as the indices for the best beams, respectively.

At 2806, eNB 2902 analyzes the distribution of preferred beam indices of UEs 2904-2910. A determination is made, at 2808, whether any of the UEs reported the same or similar best beam indices.

At 2810, the eNB may from an elevation beam for UEs with the same or similar preferred beams. According to aspects, if UEs report neighboring beams, then those UEs may also be grouped with a unified beam. For example, UEs 2906 and 2908 each feedback index 2 of elevation beam 2 as the best beam, while UE 2910 feeds back the index 1 of the neighboring elevation beam 1. Accordingly, eNB 2902 may configure a unified beam L for a vertical sector to serve the cluster of UEs 2906, 2908, and 2910.

In this manner, the eNB may analyze a distribution of a preferred beam of each UE of a plurality of UEs. The eNB may subsequently group two or more of the UEs, which share similar beam preferences, to form one or more UE clusters.

If the index of the preferred beam is not the same for a UE, then, at 2812, eNB 2902 will form a UE-specific beam using the reported beam index. For example, UE 2904 reported the index K, which is not the same and does not neighbor any of the elevation beams reported by UEs 2906-2910. Accordingly, eNB 2902 may form a UE-specific beam M for UE 2904. In this manner, some of the beams may be reserved for UE-specific elevation beamforming.

It should be noted that UEs 2906, 2908, and 2910 in the vertical sector served by unified beam L may act in the same manner as if they were in a 2D MIMO system.

Figure 30:
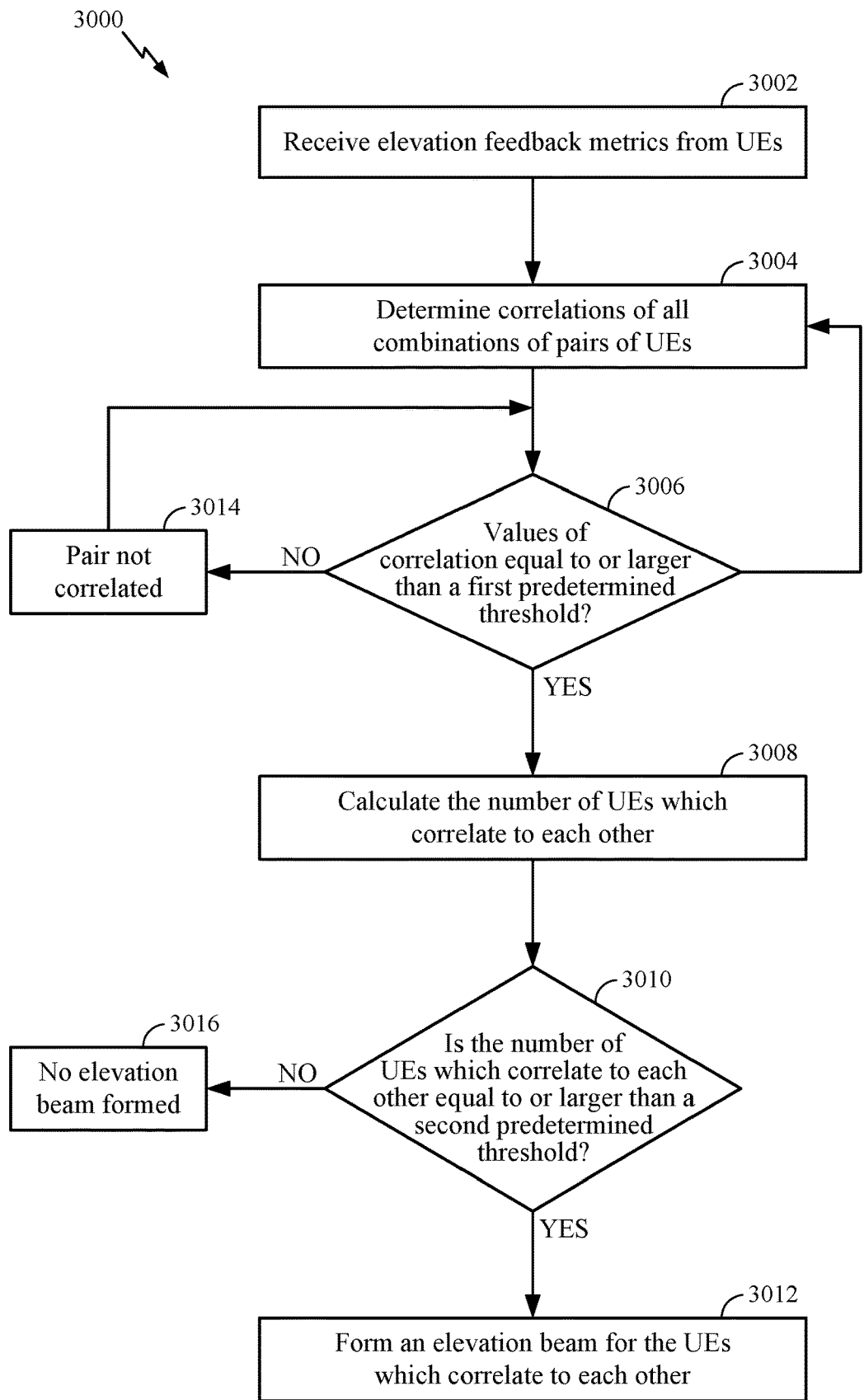
FIG. 30 illustrates example operations executed by an eNB to implement a closed-loop elevation feedback scheme according to an aspect of the present disclosure.

FIG. 30 illustrates example operations 3000 implemented in a closed-loop elevation feedback scheme according aspects of the present disclosure. At 3002, an eNB receives elevation feedback metrics from UEs within a coverage area of the eNB. The elevation feedback metrics may include rank-1 PMI, eigen vectors, and the like.

At 3004, the eNB determines correlations for all combinations of pairs of the multiple UEs. For example, the elevation feedback metrics for UEs 1-N are represented as $h_1, h_2, \ldots, h_N$. The eNB determines the correlations according to the following algorithm:

$$\begin{aligned}&\text{for } i=1:N\\&\quad\text{for } j=i:N\\&\quad\quad C_{i,j}=(h_i)^H h_j\\&\quad\text{end}\end{aligned}$$

$C_{ij}$ is a matrix which represents channel similarly between a pair of UEs ($UE_i$ and $UE_j$). According to aspects, $h_i$ may be one of a rank-1 PMI or channel eigenvector of the $UE_i$ and $h_j$ may be one of a rank-1 PMI or channel eigenvector of the $UE_j$. N represents a total number of the plurality of UEs.

At 3006, the eNB compares the value of any correlations with a first predetermined threshold $T_1$. The comparison with the first predetermined threshold determines how closely correlated the pair of UEs are. If the correlation is less than $T_1$, then, at 3014, the UEs of the pair are deemed not to be candidates for a cluster and the eNB continues comparing the other combinations, at 3006.

If the correlation of the pair is equal to or greater than $T_1$ then the UEs of the pair are designated to be cluster candidates and, at 3008, counted by the eNB as correlated UEs.

At 3010, the eNB compares the number of UEs counted as correlating to each other against a second predetermined threshold $T_2$. Depending on the design of the network, an operator may designate a certain threshold number of matched UEs that must exist before forming a cluster of UEs for the dynamic vertical sectorization. If the number of correlated UEs does not exceed $T_2$, then, at 3016, no unified elevation beam is formed for the cluster of UEs.

Otherwise, if the number of correlated UEs meets or exceeds the second threshold, then, at 3012, the eNB forms a vertical sector for the cluster of these correlated UEs with a unified elevation beam. Accordingly, the eNB may dynamically form the elevation beam for the cluster of UEs based on the feedback received from the UEs in the elevation domain.

It should be noted that the beam weight for this vector may be selected as: $w(i)=SVD([h_i \ldots h_{n(i)}])^*$, where the weight, w(i) is the singular value decomposition (SVD) of the conjugate of the correlated UEs' elevation metrics. The SVD operates to select the principal eigenvector of the feedback metrics.

It should further be noted that, in order to mitigate interference between different vertical sectors, block diagonalization (BD) may be applied. According to aspects, interference may be mitigated between an elevation beam of the vertical sector and a UE-specific elevation beam. The interference may be mitigated by forming the UE-specific beams using a zero-forcing (ZF) method or a BD method.

Open-loop and close-loop schemes each offer benefits and detriments to implementation. For example, open-loop feedback schemes require less feedback, and, therefore, are suitable for scenarios with medium UE speed. Open-loop schemes also require less complexity on both the eNB and UE sides. On the contrary, there are a limited number of orthogonal beams. Thus, fewer elevation beams may be used for determining the UE feedback.

Compared to UE-specific elevation beamforming, dynamic vertical sectorization requires little overhead and the beamforming related signaling may be multicast to the UEs in one cluster, thus, obviating the need to notify UEs one by one.

Additionally, the vertical sectors may remain in place for a longer period because the statistical properties in the vertical direction or elevation domain changes slowly over time. In typical operations, UEs usually move in the azimuth domain. Because of the lower overhead and longer vertical sector periods, the various aspects of the present disclosure offer better performance when UEs move at medium speed or move within a dense UE distribution. Accurate channel info cannot be obtained in the scenario of UE medium speed. In dense UE distributions, e.g., airport, a beam may be not narrow enough to separate different UEs.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The invention claimed is:

1. A method of wireless communication by a base station, comprising:
    generating first user equipment (UE)-specific port reference signals corresponding to a first number of antenna ports;
    transmitting the first UE-specific port reference signals to a UE;
    receiving first feedback regarding channel state information (CSI) measured by the UE based on the first UE-specific port reference signals;
    generating second UE-specific port reference signals corresponding to a second number of antenna ports;
    transmitting the second UE-specific port reference signals to the UE; and
    receiving second feedback regarding the CSI measured by the UE based on the second UE-specific port reference signals, wherein the first number of antenna ports is different than the second number of antenna ports.

2. The method of claim 1, wherein generating the first UE-specific port reference signals is based on a first uplink channel estimation, and wherein generating the second UE-specific port reference signals is based on a second uplink channel estimation.

3. The method of claim 1, wherein the first number of antenna ports or the second number of antenna ports is less than a number of antenna elements of the base station.

4. The method of claim 1, further comprising mapping pilot sequences to UE-specific antenna ports.

5. The method of claim 1, wherein the first feedback or the second feedback comprises quantized feedback comprising at least one of a preferred matrix indicator (PMI) or a rank indication (RI).

6. The method of claim 5, wherein the quantized feedback is selected from a predefined codebook.

7. The method of claim 1, further comprising transmitting, to the UE, information regarding a sub-array partition of antenna elements associated with the first number of antenna ports or the second number of antenna ports.

8. The method of claim 7, wherein the information comprises at least one of a type of sub-array partition, a structure of antenna ports, or a number of antenna ports.

9. The method of claim 1, wherein UEs are divided into multiple categories according to their capability of supporting multiple types of sub-array partitions and associated codebooks.

10. The method of claim 9, wherein certain types of UEs may support less types of sub-array partitions than other types of UEs.

11. A method of wireless communication by a user equipment (UE), comprising:
    receiving, from a base station, first UE-specific port reference signals corresponding to a first number of antenna ports;
    measuring and quantizing channel state information (CSI) based on the first UE-specific port reference signals to obtain a first quantized CSI;
    transmitting, to the base station, the first quantized CSI;
    receiving, from the base station, second UE-specific port reference signals corresponding to a second number of antenna ports;
    measuring and quantizing the CSI based on the second UE-specific port reference signals to obtain a second quantized CSI; and
    transmitting, to the base station, the second quantized CSI, wherein the first number of antenna ports is different from the second number of antenna ports.

12. The method of claim 11, wherein the first number of antenna ports or the second number of antenna ports is less than a number of antenna elements of the base station.

13. The method of claim 11, wherein the first quantized CSI or the second quantized CSI comprises at least one of a preferred matrix indicator (PMI) or a rank indication (RI).

14. The method of claim 11, further comprising receiving information regarding a sub-array partition of antenna elements associated with the first number of antenna ports or the second number of antenna ports.

15. The method of claim 14, wherein the information comprises at least one of a type of sub-array partition, a structure of antenna ports, or a number of antenna ports.

16. The method of claim 14, further comprising:
selecting, based on the information, one out of a plurality of predefined codebooks; and
using the selected codebook to report the first quantized CSI or the second quantized CSI.

17. An apparatus for wireless communication, comprising:
at least one processor configured to:
generate first user equipment (UE)-specific port reference signals corresponding to a first number of antenna ports, and
generate second UE-specific port reference signals corresponding to a second number of antenna ports, wherein the first number of antenna ports is different than the second number of antenna ports;
a transmitter configured to:
transmit, to a UE, the first UE-specific port reference signals, and
transmit, to the UE, the second UE-specific port reference signals; and
a receiver configured to:
receive first feedback regarding channel state information (CSI) measured by the UE based on the UE-specific port reference signals, and
receive second feedback regarding the CSI measured by the UE based on the second UE-specific port reference signals.

18. The apparatus of claim 17, wherein the first UE-specific port reference signals is generated based on a first uplink channel estimation, and wherein the second UE-specific port reference signals is generated based on a second uplink channel estimation.

19. The apparatus of claim 17, wherein the first number of antenna ports or the second number of antenna ports is less than a number of antenna elements of the base station.

20. The apparatus of claim 17, wherein the at least one processor is further configured to map pilot sequences to UE-specific antenna ports.

21. The apparatus of claim 17, wherein the first feedback or the second feedback comprises quantized feedback comprising at least one of a preferred matrix indicator (PMI) or a rank indication (RI).

22. The apparatus of claim 21, wherein the quantized feedback is selected from a predefined codebook.

23. The apparatus of claim 17, wherein the transmitter is further configured to transmit, to the UE, information regarding a sub-array partition of antenna elements associated with the first number of antenna ports or the second number of antenna ports.

24. The apparatus of claim 23, wherein the information comprises at least one of a type of sub-array partition, a structure of antenna ports, or a number of antenna ports.

25. The apparatus of claim 17, wherein UEs are divided into multiple categories according to their capability of supporting multiple types of sub-array partitions and associated codebooks.

26. The apparatus of claim 17, wherein certain types of UEs may support less types of sub-array partitions than other types of UEs.

27. An apparatus for wireless communication, comprising:
a receiver configured to:
receive, from a base station, first UE-specific port reference signals corresponding to a first number of antenna ports, and
receive, from the base station, second UE-specific port reference signals corresponding to a second number of antenna ports, wherein the first number of antenna ports is different from the second number of antenna ports;
at least one processor configured to:
measure and quantize channel state information (CSI) based on the first UE-specific port reference signals to obtain a first quantized CSI, and
measure and quantize the CSI based on the second UE-specific port reference signals to obtain a second quantized CSI; and
a transmitter configured to:
transmit, to the base station, the first quantized CSI, and
transmit, to the base station, the second quantized CSI.

28. The apparatus of claim 27, wherein the first number of antenna ports or the second number of antenna ports is less than a number of antenna elements of the base station.

29. The apparatus of claim 27, wherein the receiver is further configured to receive information regarding a sub-array partition of antenna elements associated with the first number of antenna ports or the second number of antenna ports, wherein the information comprises at least one of a type of sub-array partition, a structure of antenna ports, or a number of antenna ports.

30. The apparatus of claim 29, wherein the at least one processor is further configured to:
select, based on the information, one out of a plurality of predefined codebooks; and
use the selected codebook to report the first quantized CSI or the second quantized CSI.

* * * * *